(12) United States Patent
Moon et al.

(10) Patent No.: US 12,493,024 B2
(45) Date of Patent: Dec. 9, 2025

(54) SCALABLE CIRCUIT FOR MOLECULAR DETECTION

(71) Applicant: Illumina, Inc., San Diego, CA (US)

(72) Inventors: John Moon, Rancho Sante Fe, CA (US); Boyan Boyanov, San Diego, CA (US)

(73) Assignee: ILLUMINA, INC., San Diego, CA (US)

( * ) Notice: Subject to any disclaimer, the term of this patent is extended or adjusted under 35 U.S.C. 154(b) by 165 days.

(21) Appl. No.: 18/003,883

(22) PCT Filed: Mar. 15, 2022

(86) PCT No.: PCT/US2022/020395
§ 371 (c)(1),
(2) Date: Dec. 29, 2022

(87) PCT Pub. No.: WO2022/212038
PCT Pub. Date: Oct. 6, 2022

(65) Prior Publication Data
US 2024/0094189 A1    Mar. 21, 2024

Related U.S. Application Data

(60) Provisional application No. 63/169,041, filed on Mar. 31, 2021.

(51) Int. Cl.
*G01N 33/487* (2006.01)
(52) U.S. Cl.
CPC ............................ *G01N 33/48721* (2013.01)
(58) Field of Classification Search
None
See application file for complete search history.

(56) References Cited

U.S. PATENT DOCUMENTS

| 6,413,792 B1 | 7/2002 | Sauer et al. |
| 7,279,337 B2 | 10/2007 | Zhu |
| (Continued) | | |

FOREIGN PATENT DOCUMENTS

| CN | 104254771 | 12/2014 |
| CN | 105478113 | 3/2016 |
| (Continued) | | |

OTHER PUBLICATIONS

Derrington et al., Sep. 14, 2010, Nanopore DNA sequencing with MspA, PNAS 107(37):16060-16065.
(Continued)

*Primary Examiner* — Aaron A Priest
(74) *Attorney, Agent, or Firm* — Knobbe, Martens, Olson & Bear, LLP

(57) ABSTRACT

In one aspect, the disclosed technology relates to systems and methods for sequencing polynucleotides. In one embodiment, the disclosed technology relates to a nanopore sensor device for identifying nucleotides, the nanopore sensor device including: one or more cis wells; one or more cis electrodes associated with the one or more cis wells; a plurality of trans wells, each of the plurality of trans wells separated from the one or more cis wells by a lipid or solid-state membrane having a nanopore; a plurality of field effect transistors (FETs), each of the plurality of FETs associated with one of the plurality of trans wells; an electrical source configured to provide alternating current (AC) inputs between the one or more cis electrodes and the source terminals of the plurality of FETs; and a controller operably coupled to the plurality of FETs, the controller configured to measure AC responses of the plurality of FETs, wherein the AC responses depend on the identities of the nucleotides within or near the nanopores.

20 Claims, 14 Drawing Sheets

(56) References Cited

U.S. PATENT DOCUMENTS

| | | | |
|---|---|---|---|
| 8,628,919 B2 | 1/2014 | Xiao et al. | |
| 8,669,124 B2 | 3/2014 | Merz | |
| 8,698,481 B2 | 4/2014 | Lieber et al. | |
| 8,961,763 B2 | 2/2015 | Dunbar et al. | |
| 9,017,937 B1 | 4/2015 | Turner et al. | |
| 9,494,554 B2 | 11/2016 | Davis et al. | |
| 9,551,697 B2 | 1/2017 | Chen | |
| 9,696,277 B2 | 7/2017 | Dunbar et al. | |
| 9,708,655 B2 | 7/2017 | Mandell et al. | |
| 9,732,381 B2 | 8/2017 | Stoddart et al. | |
| 9,738,927 B2 | 8/2017 | So | |
| 9,765,392 B2 | 9/2017 | Peng et al. | |
| 9,863,912 B2 | 1/2018 | Dunbar et al. | |
| 10,036,064 B2 | 7/2018 | Merriman et al. | |
| RE47,067 E | 10/2018 | Turner et al. | |
| 10,093,975 B2 | 10/2018 | Esfandyarpour | |
| 10,364,463 B2 | 7/2019 | Mandell et al. | |
| 10,488,394 B2 | 11/2019 | Liu et al. | |
| 10,648,022 B2 | 5/2020 | Gunderson et al. | |
| 10,845,333 B2 | 11/2020 | Fujita et al. | |
| 10,902,939 B2 | 1/2021 | Merriman et al. | |
| 10,975,428 B2 | 4/2021 | Jayasinghe et al. | |
| 11,054,390 B2 | 7/2021 | Dunbar et al. | |
| 2007/0059741 A1* | 3/2007 | Kamahori | C12Q 1/6834 435/6.16 |
| 2009/0027036 A1 | 1/2009 | Nuckolls et al. | |
| 2011/0171629 A1 | 7/2011 | Swager et al. | |
| 2014/0329693 A1 | 11/2014 | Reid et al. | |
| 2017/0022546 A1 | 1/2017 | Bashir et al. | |
| 2017/0240962 A1 | 8/2017 | Merriman et al. | |
| 2017/0275678 A1 | 9/2017 | Sharaf et al. | |
| 2018/0155773 A1 | 6/2018 | Gunderson et al. | |
| 2018/0372713 A1 | 12/2018 | Stamm et al. | |
| 2019/0041378 A1 | 2/2019 | Choi et al. | |
| 2019/0169684 A1 | 6/2019 | Oldham et al. | |
| 2019/0178840 A1 | 6/2019 | Bashir et al. | |
| 2019/0256904 A1 | 8/2019 | Davis et al. | |
| 2019/0310242 A1 | 10/2019 | Reid et al. | |
| 2019/0382834 A1 | 12/2019 | Clarke et al. | |
| 2020/0002758 A1 | 1/2020 | Moon | |
| 2020/0141931 A1 | 5/2020 | Hoffman | |
| 2020/0200734 A1 | 6/2020 | Yu et al. | |
| 2020/0232026 A1 | 7/2020 | Mannion et al. | |
| 2020/0292521 A1 | 9/2020 | Xie et al. | |
| 2020/0325535 A1 | 10/2020 | Akeson et al. | |
| 2020/0400648 A1 | 12/2020 | Xie | |
| 2021/0018486 A1 | 1/2021 | Bajaj | |
| 2021/0147486 A1 | 5/2021 | Remaut et al. | |
| 2021/0184053 A1* | 6/2021 | Chen | G01N 27/4146 |

FOREIGN PATENT DOCUMENTS

| | | | |
|---|---|---|---|
| CN | 111836904 | 10/2020 | |
| EP | 2 411 536 | 9/2014 | |
| WO | WO-2005022142 A1 * | 3/2005 | G01N 27/4145 |
| WO | WO-2008007716 A1 * | 1/2008 | G01N 27/4148 |
| WO | WO 19/055687 | 3/2019 | |
| WO | WO 19/055856 | 3/2019 | |
| WO | WO 19/160925 | 8/2019 | |
| WO | WO-2019160925 A1 * | 8/2019 | H10D 30/6757 |
| WO | WO 20/005557 | 1/2020 | |
| WO | WO 21/021944 | 2/2021 | |

OTHER PUBLICATIONS

Liu et al., 2016, Solid state nanopore-based NDA sequencing technology, Journal of Nanomaterials, 2016:Article ID 5284766, 13 pp.

Namhil, Jan. 2018, Nanogap capacitive biosensor for label-free aptamer-based protein detection, doctoral thesis, University of Hull, School of Mathematics and Physical Sciences, 192 pp.

Sigalov et al., Jan. 2008, Detection of DNA sequences using an alternating electric field in a nanopore capacitor, Nano Lett., 8(1):56-63.

Sung et al., Apr. 1987, Why is gramicidin valence selective? A theoretical study, Biophys. J., 51:661-672.

International search report and written opinion dated Jun. 2, 2022 in application No. PCT/US2002/020395.

* cited by examiner

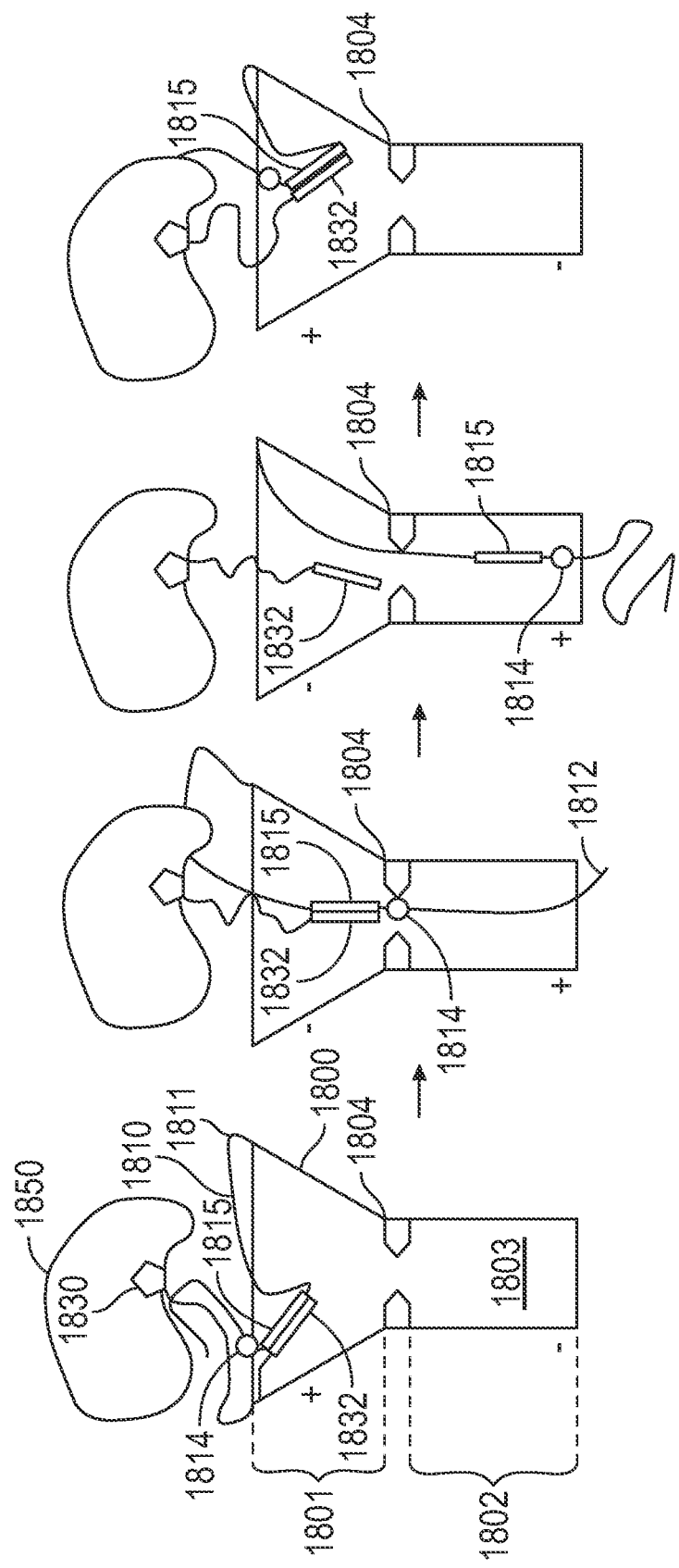

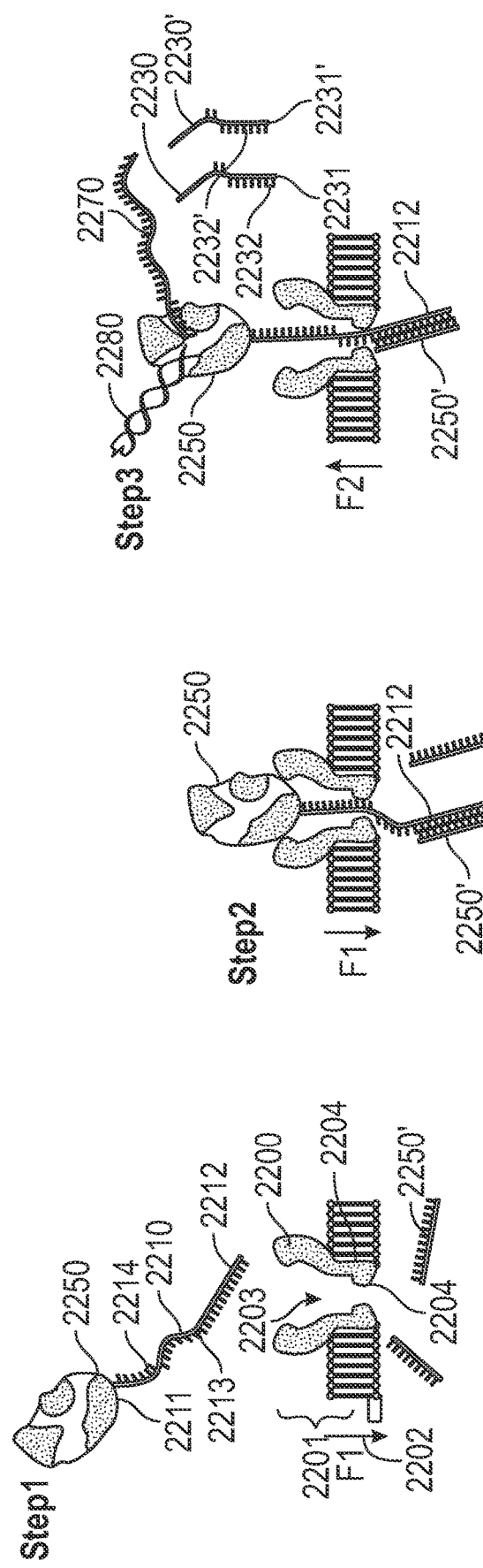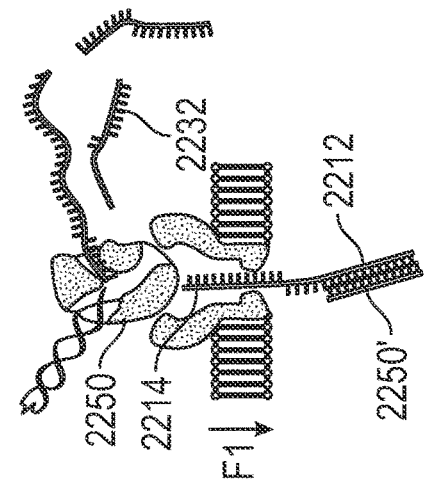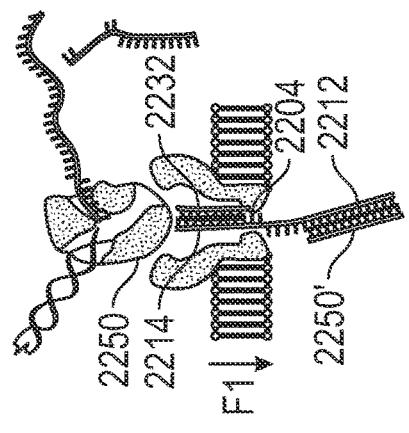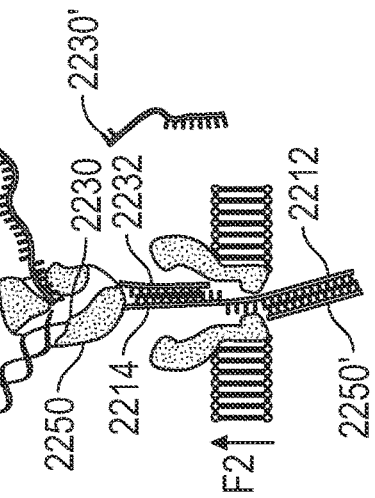

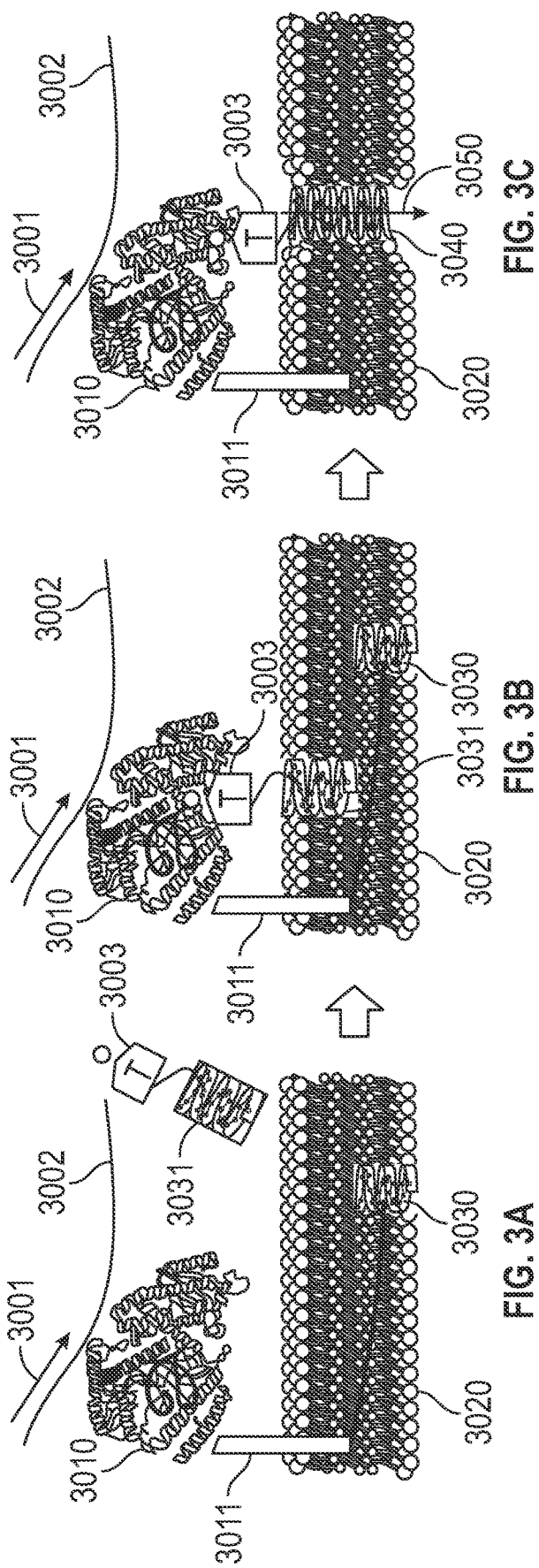

SCALABLE CIRCUIT FOR MOLECULAR DETECTION

CROSS-REFERENCE TO RELATED APPLICATIONS

This application is a U.S. national phase application under 35 U.S.C. § 371 of International Application No. PCT/US2022/020395, filed Mar. 15, 2022, which claims priority to U.S. Provisional Application No. 63/169,041, filed Mar. 31, 2021, the contents of which are incorporated by reference in their entireties.

BACKGROUND

Some polynucleotide sequencing techniques involve performing a large number of controlled reactions on support surfaces or within predefined reaction chambers. The controlled reactions may then be observed or detected, and subsequent analysis may help identify properties of the polynucleotide involved in the reaction. Examples of such sequencing techniques include next-generation sequencing or massive parallel sequencing involving sequencing-by-ligation, sequencing-by-synthesis, reversible terminator chemistry, or pyrosequencing approaches.

Some polynucleotide sequencing techniques utilize a nanopore, which can provide a path for an ionic electrical current. For example, as the polynucleotide traverses through the nanopore, it influences the electrical current through the nanopore. Each passing nucleotide, or series of nucleotides, that passes through the nanopore yields a characteristic electrical current. These characteristic electrical currents of the traversing polynucleotide can be recorded to determine the sequence of the polynucleotide.

However, state of the art nanopore sequencing technologies may suffer from several problems. For example, electrochemical DC current readout of nanopores is not scalable to small trans-well volumes. Further, small currents through pores make for big amplifiers. Moreover, large bilayer capacitance makes switching readout difficult. Furthermore, large resistor-capacitor (RC) transients while bilayer charges or discharges. Prior methods may apply a direct current (DC) or square wave input, which requires waiting for the transient electrical responses to decay away before reading out the steady state signals. Therefore, measuring the ionic current of prior nanopores may incorrectly be measuring the RC transient.

SUMMARY

Provided in examples herein are systems for sequencing biopolymers and methods of using the systems.

In one aspect, disclosed herein is a nanopore sensor device for identifying nucleotides. The device may comprise one or more cis wells; one or more cis electrodes associated with the one or more cis wells; a plurality of trans wells, each of the plurality of trans wells separated from the one or more cis wells by a lipid or solid-state membrane having a nanopore; a plurality of field effect transistors (FETs), each of the plurality of FETs associated with one of the plurality of trans wells; an electrical source configured to provide alternating current (AC) inputs between the one or more cis electrodes and the source terminals of the plurality of FETs; and a controller operably coupled to the plurality of FETs, the controller configured to measure AC responses of the plurality of FETs, wherein the AC responses depend on the identities of the nucleotides within or near the nanopores. In some embodiments, the controller is configured to measure changes of the amplitudes of the AC responses. In some embodiments, the controller is configured to measure changes of the waveform shapes of the AC responses. In some embodiments, the electrical source is configured to provide an AC voltage in a sinusoidal, rectangular, triangular, saw-tooth, or another suitable waveform alternating between a positive potential and a negative potential. In some embodiments, the ionic fluxes through the nanopores are modulated by: nucleotides passing through the nanopores, labels on nucleotides being incorporated to polynucleotides, or any combination thereof.

In one aspect, disclosed herein is a method of identifying nucleotides. The method may comprise providing a nanopore within a membrane separating a cis well and a trans well; providing an AC input from an electrical source operably coupled to a cis electrode in the cis well and to the source terminal of a FET in the trans well; and measuring an AC response from the FET, wherein the AC response depends on the identity of a nucleotide within or near the nanopore. In some embodiments, measuring the AC response comprises measuring a change of the amplitude of the AC response. In some embodiments, measuring the AC response comprises measuring a change of the waveform of the AC response. In some embodiments, providing the AC input comprises providing an AC voltage in a sinusoidal, rectangular, triangular, saw-tooth, or another suitable waveform alternating between a positive potential and a negative potential. In some embodiments, measuring the AC response comprises measuring a first response associated with a first nucleotide and a second response associated with a second nucleotide without waiting for a transient response to approach a steady-state response.

In one aspect, disclosed herein is a sensor device for identifying nucleotides. The device may comprise an electrode; a FET; a partially double-stranded nucleic acid polymer having one end operably coupled to the electrode and the other end operably coupled to the gate terminal of the FET; an electrical source configured to provide an AC input between the electrode and the source terminal of the FET; and a controller operably coupled to the FET, the controller configured to measure an AC response of the FET, wherein the AC response depends on the identity of a nucleotide interacting with the partially double-stranded nucleic acid polymer. In some embodiments, the controller is configured to measure a change of the amplitude of the AC response. In some embodiments, the controller is configured to measure a change of the waveform shape of the AC response. In some embodiments, the electrical source is configured to provide an AC voltage in a sinusoidal, rectangular, triangular, saw-tooth, or another suitable waveform alternating between a positive potential and a negative potential. In some embodiments, electrical conduction through the partially double-stranded nucleic acid polymer is modulated by a nucleic acid label on a nucleotide being incorporated to a polynucleotide, the nucleic acid label being partially complementary to the partially double-stranded nucleic acid polymer.

The systems, devices, kits, and methods disclosed herein each have several aspects, no single one of which is solely responsible for their desirable attributes. Without limiting the scope of the claims, some prominent features will now be discussed briefly. Numerous other examples are also contemplated, including examples that have fewer, additional, and/or different components, steps, features, objects, benefits, and advantages. The components, aspects, and steps may also be arranged and ordered differently. After considering this discussion, and particularly after reading the section entitled "Detailed Description," one will understand how the features of the devices and methods disclosed herein provide advantages over other known devices and methods.

It is to be understood that any features of the device and/or of the array disclosed herein may be combined together in any desirable manner and/or configuration. Further, it is to be understood that any features of the method of using the device may be combined together in any desirable manner. Moreover, it is to be understood that any combination of features of this method and/or of the device and/or of the array may be used together, and/or may be combined with any of the examples disclosed herein. Still further, it is to be understood that any feature or combination of features of any of the devices and/or of the arrays and/or of any of the methods may be combined together in any desirable manner, and/or may be combined with any of the examples disclosed herein.

It should be appreciated that all combinations of the foregoing concepts and additional concepts discussed in greater detail below are contemplated as being part of the inventive subject matter disclosed herein and may be used to achieve the benefits and advantages described herein.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 1A, FIG. 1B, FIG. 1C and FIG. 1D schematically illustrate embodiments including a nanopore.

FIG. 2A, FIG. 2B, FIG. 2C, FIG. 2D, FIG. 2E and FIG. 2F schematically illustrate embodiments including a tether anchored adjacent to a biological nanopore.

FIG. 3A, FIG. 3B and FIG. 3C schematically illustrate embodiments including a nanopore formed with ionophores.

DETAILED DESCRIPTION

Figure 1E:
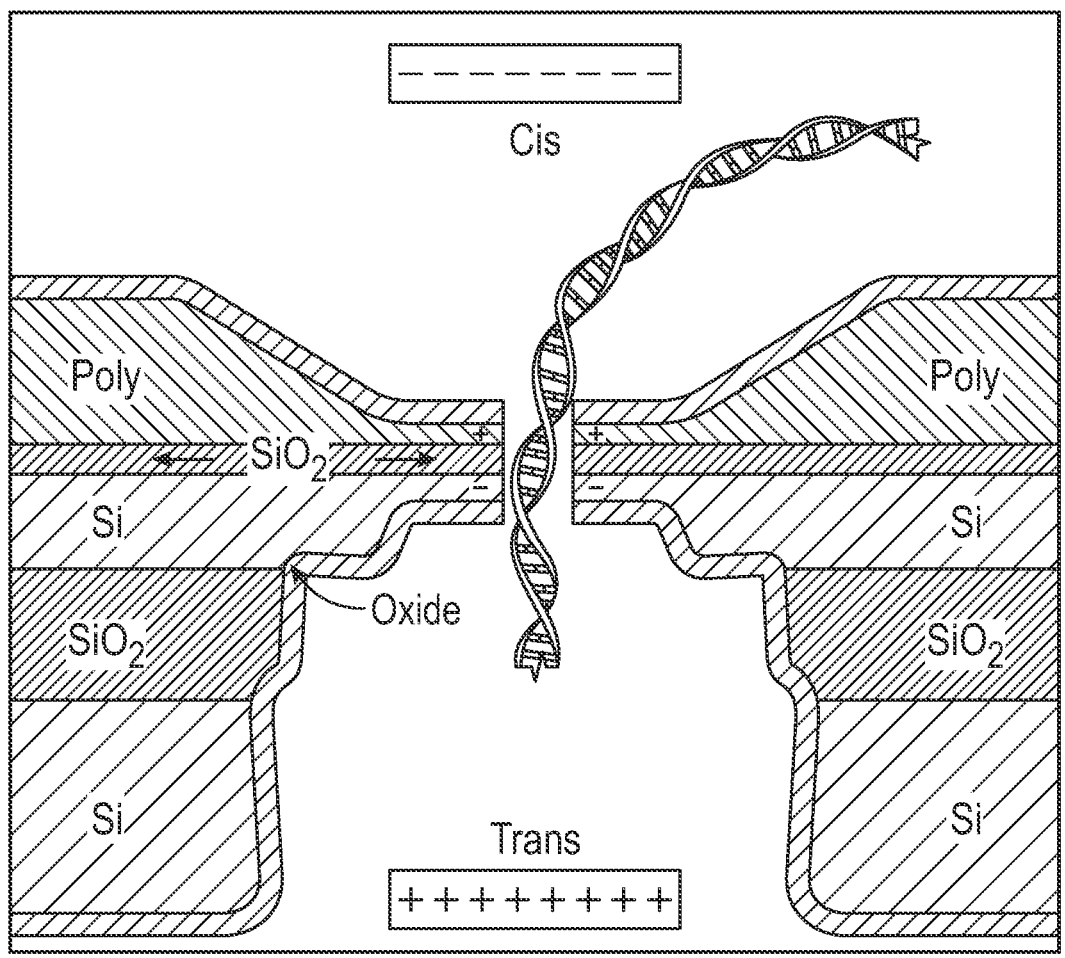
FIG. 1E schematically illustrates an example of a solid-state nanopore.

All patents, applications, published applications and other publications referred to herein are incorporated herein by reference to the referenced material and in their entireties. If a term or phrase is used herein in a way that is contrary to or otherwise inconsistent with a definition set forth in the patents, applications, published applications and other publications that are herein incorporated by reference, the use herein prevails over the definition that is incorporated herein by reference.

INTRODUCTION

The disclosed technology relates to systems and methods for sequencing a biopolymer (e.g., DNA, RNA, polypeptide or protein) by identifying monomers (e.g., nucleotides or amino acids) based on alternating current (AC) electrical responses. Each specific type of monomer, or alternatively its unique label or barcode, can act as part of a resistor in the equivalent circuit of a disclosed system. When an AC input (e.g., a sine wave current or voltage) is applied to the system, the electrical responses of the system may be a function of the resistance, which depends on the identity of the monomer, and of capacitances in the system. The capacitances in the system may be associated with membranes or transistors in the system. The phase, amplitude, or waveform of the AC electrical responses can be read out (e.g., by transistors) to determine the sequence of the biopolymer.

In certain embodiments, using an AC input in the disclosed technology eliminates the need for waiting due to a RC transient delay, and may therefore allow for a faster readout and/or a more accurate readout. In certain embodiments, measurement sensitivity is increased when the frequency of the AC input is tailored for the electrical properties of the disclosed system. In addition, biopolymers are often dissolved in electrolytes or buffer solutions, and it may be beneficial to have non-Faradaic processes without net electrochemical reaction in the disclosed system. In certain embodiments, working in AC mode and without net electrochemical reaction can achieve less buffer consumption, smaller sequencing unit devices, and/or a more scalable ensemble of sequencing unit devices. In certain embodiments, the AC readout approach provides a scalable, electrochemistry-free, and/or high-bandwidth application of nanopore sequencing.

In non-Faradaic conduction, no chemical reaction (reduction or oxidation of chemical substances) occurs at the surface of the metal electrode. The changing potential across the electrical double layer (which behaves like a capacitor) between the metal electrode and the electrolyte drives the ion flow. For non-Faradaic conduction, the metal electrode may be made of metals that are resistant to corrosion and oxidation, for example, titanium or noble metals such as platinum or gold. Despite the lack of chemical interaction between the electrode and the electrolyte, there is transient physical displacement of ions in the electrolyte from the growth and shrinkage of the ion depletion region at the metal-liquid interface, in response to the applied potential. This ion depletion region is referred to as an "electrical double layer" in electrochemistry. Using an electrical engineering model, a parallel plate capacitor forms where the metal is one plate, the depletion region is the dielectric, and the diffuse distribution of ions in the liquid is the other plate.

Operation of a Sequencing Device

The operation principles of a system and a method for identifying organic molecules based on electrical responses are described herein. In one embodiment, such system may include a flow chamber containing a liquid, one or more electrodes, one or more structures having capacitance, and a transistor. A molecule of interest may be dissolved in the liquid. Moreover, the molecule of interest may act as part of a resistor in an equivalent circuit of the system, where the resistance may be a function of the identity of the molecule of interest. The one or more structures having capacitance may be connected in series or in parallel with the resistor. In some cases, the transistor itself may have capacitances that cannot be ignored in the equivalent circuit. An alternating current or voltage may be applied to the system, and the electrical response of the system may be a function of the identity of the molecule of interest. The phase, amplitude, or waveform of the electrical response may be read out by the transistor and used to determine the identity of the molecule of interest. In some cases, the molecules of interest may be different nucleotides or amino acids. In some cases, the liquid may be an electrolyte/buffer solution. In some embodiments, multiple such systems (or multiple nanopore sequencing devices) may be arranged in an array and individually accessed by a logic circuit. For example, each column in the array may be controlled using one selector device, and each row in the array may be read out using one amplifier. In some cases, each system in the array does not require an amplifier on its own, and therefore such array may be more scalable. In some embodiments, the biopolymers in the respective nanopore sequencing devices may be controlled or actuated substantially simultaneously. In some embodiments, the biopolymers in the respective nanopore sequencing devices may be detected or sequenced substantially simultaneously.

In examples wherein a plurality of nanopore sequencing devices forms an array on a substrate, each of the plurality of the nanopore sequencing devices in the array may share a common cis electrode and a common trans electrode. In another example, each of the plurality of the nanopore sequencing devices shares a common cis electrode, but has a distinct trans electrode. In yet another example, each of the plurality of the nanopore sequencing devices has a distinct cis electrode and a distinct trans electrode. In still another example, each of the plurality of nanopore sequencing devices has a distinct cis electrode and shares a common trans electrode.

In a substrate with an array of nanopore sequencing devices, there may be one common cis well and one common trans well communicating with a portion, or all, of the nanopore sequencing devices within the array on the substrate. However, it should be understood that an array of the nanopore devices may also include several cis wells that are fluidically isolated from one another and are fluidically connected to respective one or more trans wells fluidically isolated from one another and defined in the substrate. Multiple cis wells may be desirable, for example, in order to enable the measurement of multiple polynucleotides on a single substrate. In some embodiments, a substrate with an array of nanopore sequencing devices comprises one common cis electrode, one common trans electrode, one common cis well, one common trans well, and a plurality of nanopore sequencing devices, In other embodiments, the substrate with an array of nanopore sequencing devices comprises one common cis well, a plurality of trans wells, and a plurality of nanopore sequencing devices, where each nanopore sequencing device can be individually addressable with individual trans electrodes. In other embodiments, the substrate with an array of nanopore sequencing devices comprises a plurality of cis wells, a plurality of trans wells, and a plurality of nanopore sequencing devices, where each nanopore sequencing device can be individually addressable with individual trans electrodes. In some examples, the cis well may be in contact with an array of nanopores, and thus is capable of maintaining the electrolyte in contact with each of the nanopores in the array.

A substrate comprising an array of nanopore sequencing devices may have many different layouts of nanoscale openings on the array, including regular, repeating, and non-regular patterns of nanoscale openings. In an example, the nanoscale openings may be disposed in a hexagonal grid for close packing and improved density of the devices. Other array layouts may include, for example, rectilinear (i.e., rectangular) layouts, triangular layouts, and so forth. As examples, the layout or pattern can be an x-y format of nanoscale openings that are in rows and columns. In some other examples, the layout or pattern can be a repeating arrangement of nanoscale openings. In still other examples, the layout or pattern can be a random arrangement of nanoscale openings. The pattern may include spots, posts, stripes, swirls, lines, triangles, rectangles, circles, arcs, checks, plaids, diagonals, arrows, squares, and/or crosshatches.

The layout of nanoscale openings may be characterized with respect to the density of nanoscale openings (i.e., number of nanoscale openings in a defined area of the substrate comprising the array). For example, an array of nanoscale openings may be present at a density ranging from about 10 nanoscale openings per $mm^2$ to about 1,000,000 nanoscale openings per $mm^2$. The density may also include, for example, a density of at least about 10 per $mm^2$, about 5,000 per $mm^2$, about 10,000 per $mm^2$, about 0.1 million per $mm^2$, or more. Alternatively or additionally, the density may no more than about 1,000,000 per $mm^2$, about 0.1 million per $mm^2$, about 10,000 per $mm^2$, about 5,000 per $mm^2$, or less. It is to be further understood that the density of the nanoscale openings in the substrate can be between one of the lower values and one of the upper values selected from the ranges above.

The layout of nanoscale openings in an array on a substrate may also be characterized in terms of the average pitch, i.e., the spacing from the center of a nanoscale opening to the center of an adjacent nanoscale opening (center-to-center spacing). The pattern can be regular such that the coefficient of variation around the average pitch is small, or the pattern can be non-regular in which case the coefficient of variation can be relatively large. In an example, the average pitch may range from about 100 nm to about 500 μm. The average pitch can be, for example, at least about 100 nm, about 5 μm, about 10 μm, about 100 μm, or more. Alternatively or additionally, the average pitch can be, for example, at most about 500 μm, about 100 μm, about 50 μm, about 10 μm, about 5 μm, or less. The average pitch for an example array of devices can be between one of the lower values and one of the upper values selected from the ranges above. In an example, the array may have a pitch (center-to-center spacing) of about 10 μm. In another example, the array may have a pitch (center-to-center spacing) of about 5 μm. In yet another example, the array may have a pitch (center-to-center spacing) ranging from about 1 μm to about 10 μm.

In some examples, an array lifetime is about or above 48 hours, and a typical diameter of the trans well is about or above 100 µm.

Embodiments

One aspect of the disclosed technology relates to nanopore sequencing of nucleic acids. In one embodiment, the disclosed system includes a nanopore. The disclosed system may include a flow chamber containing an electrolyte, and thus applying a voltage across the system results in an ionic current through the nanopore. The molecule of interest may be a nucleotide, or equivalently, a unique tag or label of the nucleotide. For example, a tag or label of the nucleotide may be a particular sequence combination of nucleotides. When the molecule of interest is in or near the nanopore, it may result in a unique ionic current blockade at the nanopore, and therefore a unique nanopore resistance depending on the identity of the molecule of interest. In some cases, the nanopore may be a biological nanopore formed of protein or DNA and deposited in a lipid bilayer. In other cases, the nanopore may be a solid-state nanopore directly formed as a nanoscale opening in a membrane (e.g., silicon based, graphene, or polymer membrane). The nanopore may even be a biological and solid-state hybrid. The lipid bilayer or the membrane may act as a capacitor in the equivalent circuit of the system. In some embodiments, the disclosed system may be used to identify amino acids or other biomolecules.

Figure 6:
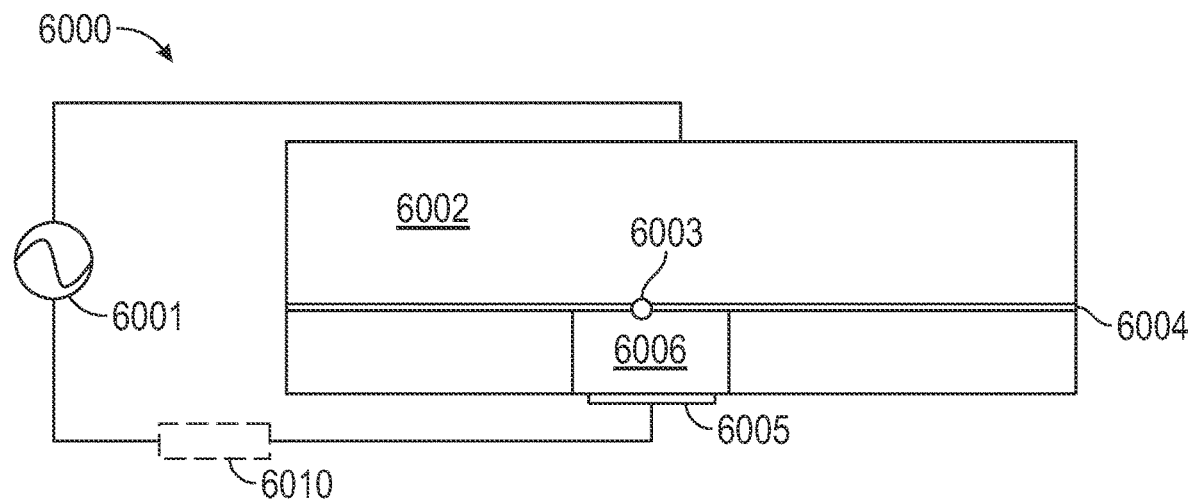
FIG. 6 schematically illustrates an embodiment including a nanopore and an AC electrical source.

One embodiment of the disclosed system is illustrated in FIG. 6. In FIG. 6, A nanopore sensor device 6000 for identifying nucleotides is shown. The nanopore sensor device 6000 may include one or more cis wells 6002. The nanopore sensor device 6000 may further include one or more cis electrodes associated with the one or more cis wells. The nanopore sensor device 6000 may further include a plurality of trans wells 6006. Each of the plurality of trans wells may be separated from the one or more cis wells by a lipid or solid-state membrane 6004 having a nanopore 6003. The nanopore sensor device 6000 may further include a plurality of field effect transistors 6005 (FETs), each of the plurality of FETs associated with one of the plurality of trans wells.

Figure 9:
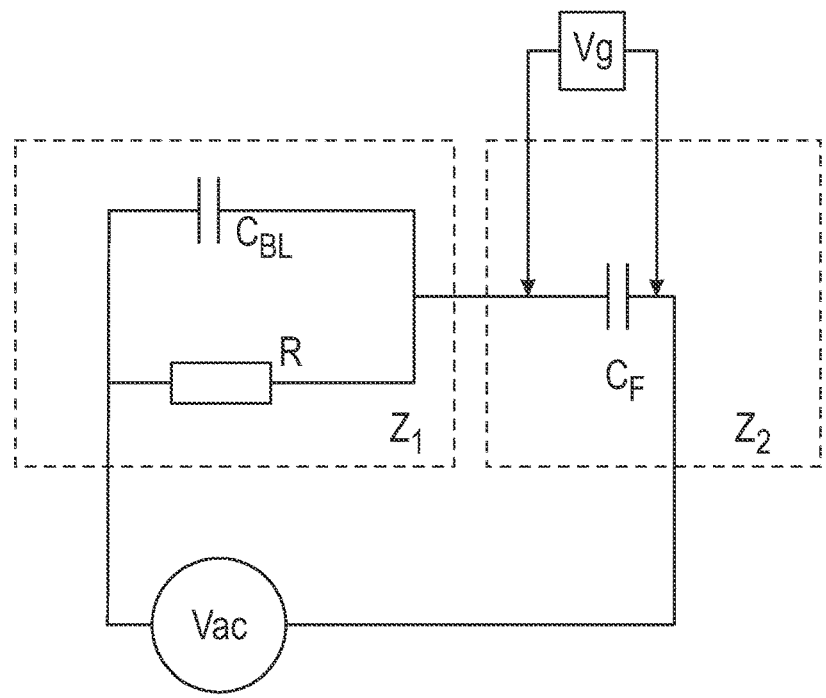
FIG. 9 shows an equivalent circuit for the embodiment of FIG. 6.
Figure 15A:
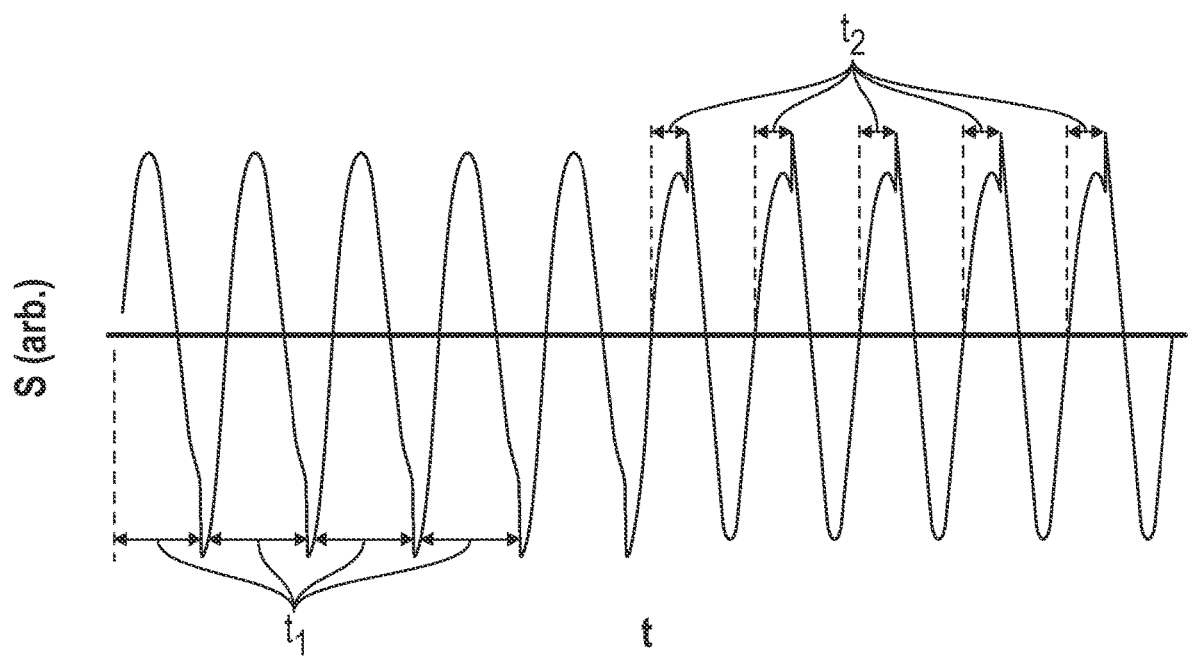
FIG. 15A and FIG. 15B illustrate exemplary AC response waveforms.
Figure 15B:
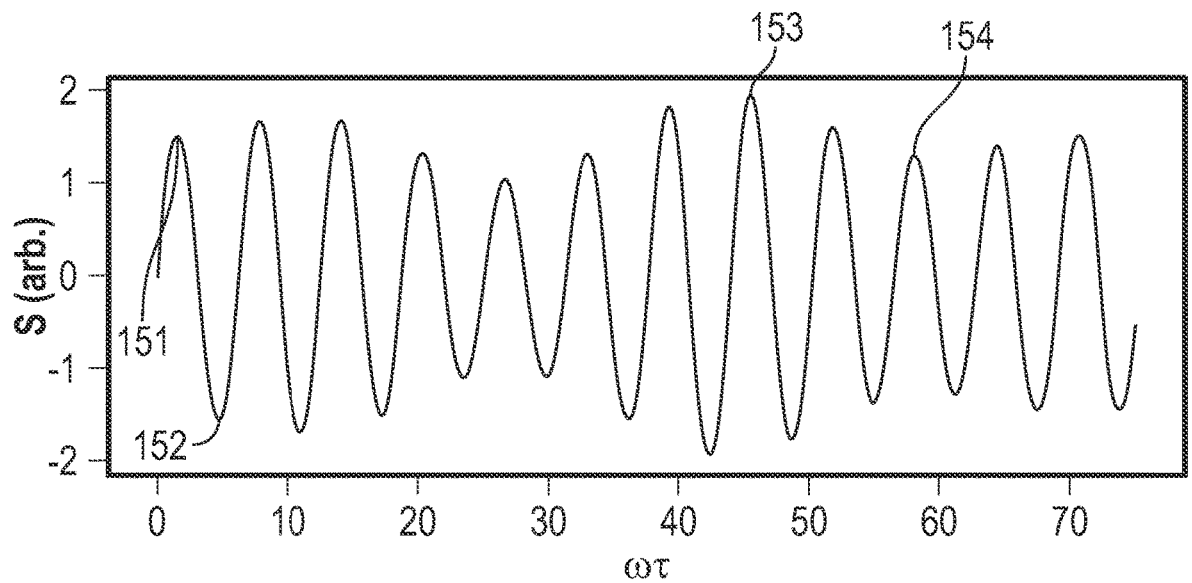

The nanopore sensor device 6000 may further include an electrical source 6001 configured to provide alternating current (AC) inputs between the one or more cis electrodes and the source terminals of the plurality of FETs. The nanopore sensor device 6000 may further include a controller 6010 operably coupled to the plurality of FETs, the controller 6010 configured to measure AC responses of the plurality of FETs, wherein the AC responses depend on the identities of the nucleotides within or near the nanopores. FIG. 15A and FIG. 15B illustrate exemplary AC response waveforms. Changes to the nanopore resistance may cause amplitude and phase modulation of the waveforms as shown in FIG. 15B. In some cases, the controller 6010 is configured to measure changes of the amplitudes of the AC responses, e.g., as shown in comparing points 153 and 154 in FIG. 15B. For example, the amplitude may be obtained by comparing the maximal and minimal points 151 and 152 in FIG. 15B. In some cases, the controller 6010 is configured to measure changes of the waveform shapes of the AC responses. In some cases, the electrical source is configured to provide an AC voltage in a sinusoidal, rectangular, triangular, saw-tooth, or another suitable waveform alternating between a positive potential and a negative potential. In some cases, ionic fluxes through the nanopores are modulated by; nucleotides passing through the nanopores, labels on nucleotides being incorporated to polynucleotides, or any combination thereof. FIG. 9 shows an equivalent circuit of the nanopore sensor device 6000.

To determine the identity of the molecule of interest, the disclosed method may apply an AC voltage across the system and reads out the voltage or current response from the transistor. By applying an AC voltage, the system will have a non-Faradaic, capacitive response depending on the identity of the molecule of interest, and the system may not have a net electrochemical reaction. Using an AC voltage may also allow for a faster readout. Measurement sensitivity may be increased if the AC voltage frequency is at around the frequency of resonance of nanopore and bilayer/membrane.

For example, in reference to FIG. 6, a method of identifying nucleotides may include providing a nanopore 6003 within a membrane 6004 separating a cis well 6002 and a trans well 6006. The method of identifying nucleotides may further include providing an AC input from an electrical source 6001 operably coupled to a cis electrode in the cis well and to the source terminal of a FET 6005 in the trans well. The method of identifying nucleotides may further include measuring an AC response from the FET, wherein the AC response depends on the identity of a nucleotide within or near the nanopore 6003.

In some cases, measuring the AC response includes measuring a change of the amplitude of the AC response. In some cases, measuring the AC response includes measuring a change of the waveform of the AC response. In some cases, providing the AC input includes providing an AC voltage in a sinusoidal, rectangular, triangular, saw-tooth, or another suitable waveform alternating between a positive potential and a negative potential. In some cases, measuring the AC response includes measuring a first response associated with a first nucleotide and a second response associated with a second nucleotide without waiting for a transient response to approach a steady-state response.

In certain embodiments, the equivalent circuit shown in FIG. 9 satisfies the following equations. $V_g$ is the measured voltage on FET gate and can be computed by $$V_g = V_{ac} \frac{Z_2}{Z_1 + Z_2}, \text{ where } \frac{1}{Z_1} = j\omega C_{BL} + \frac{1}{R} \text{ and } \frac{1}{Z_2} = j\omega C_F.$$

In FIG. 9, ω represents the frequency of the AC input, R represents the resistance of the nanopore, $C_{BL}$ represents the capacitance of the lipid bilayer, and $C_F$ represents the capacitance associated with the FET.

Figure 10:
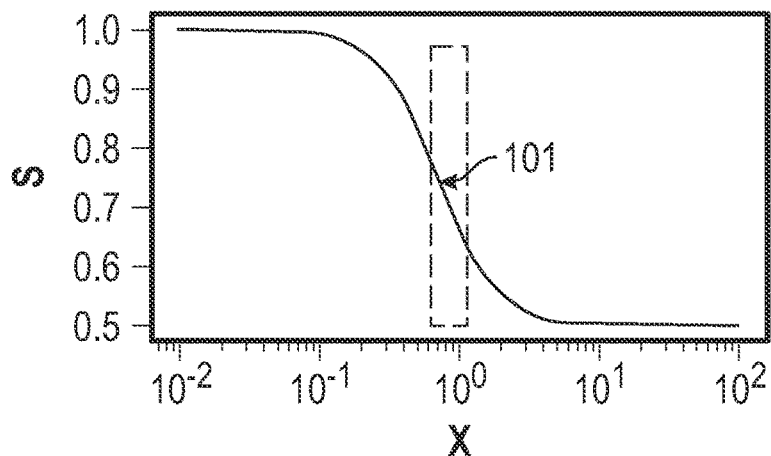
FIG. 10 plots the response of the circuit shown in FIG. 9 under some parameters.

FIG. 10 plots the response $$S = \text{Re}\left(\frac{V_g}{V_{ac}}\right) = \frac{1 + x^2}{1 + 2x^2}$$

under certain parameters, where $x = \sqrt{2}\omega RC$ and assuming $C_F = C_{BL} = C$. The x-axis plots the frequency of the AC source or of the signal as measured by the FET. The location 101 of the largest sensitivity to changes in R can be found at $$x = \frac{1}{\sqrt{2}} \Rightarrow \omega = \frac{1}{2RC}.$$

In other words, location 101 is the resonant frequency of the nanopore and membrane/bilayer in which the signal to the FET is sensitive to changes in the pore resistance or at or near the inflection point of the resistivity of the nanopore and membrane/bilayer.

Figure 11A:
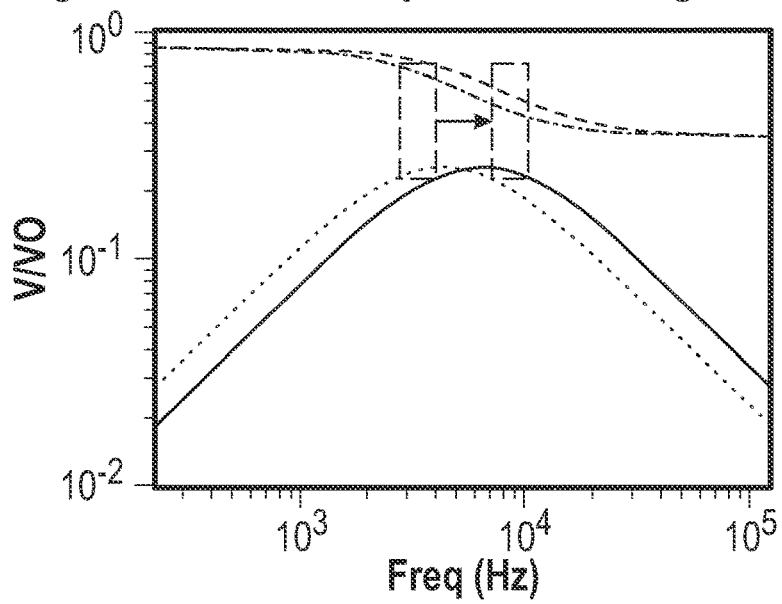
FIG. 11A, FIG. 11B and FIG. 11C plot the response of the circuit shown in FIG. 9 under other parameters.
Figure 11B:
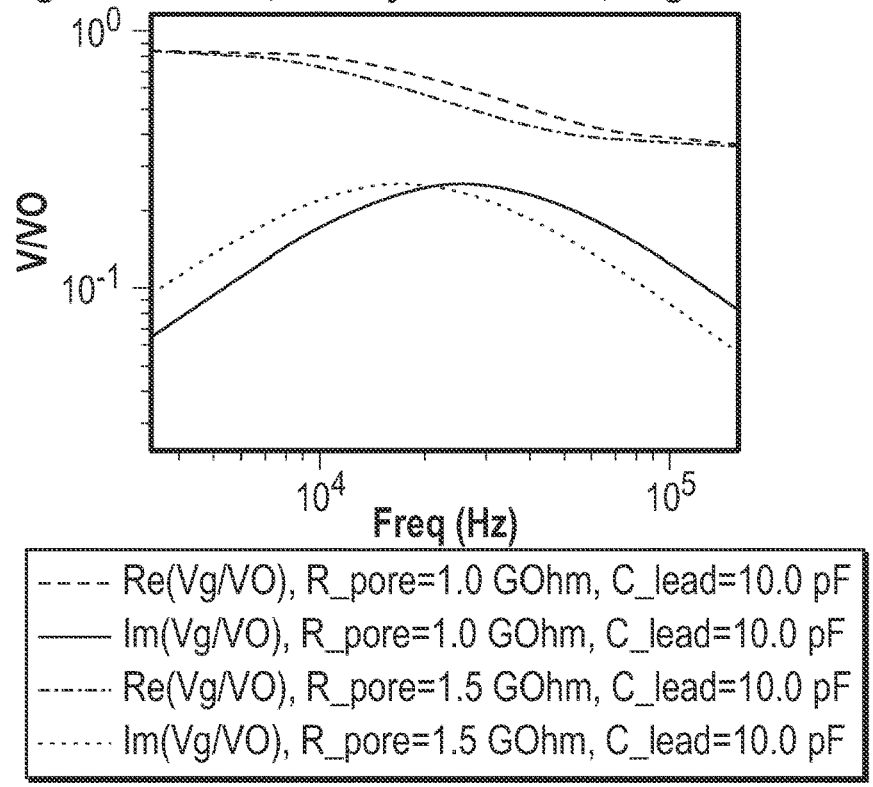
Figure 11C:
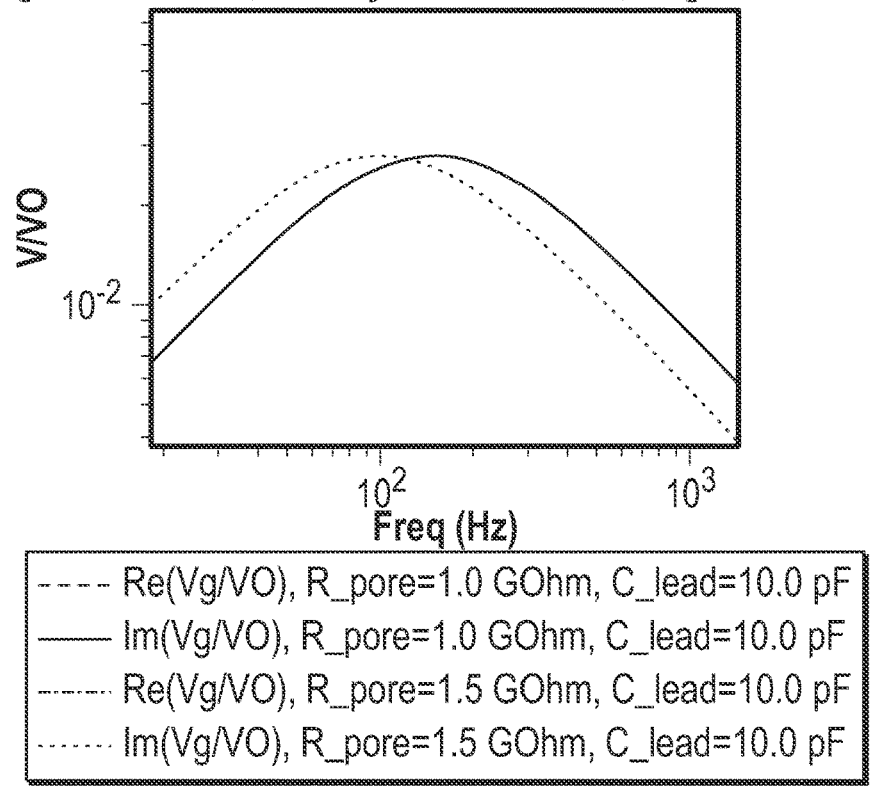

FIG. 11A, FIG. 11B and FIG. 11C plot the response under different parameters and shows that changes in pore resistance (R_pore) result in the change in resonant frequency of the nanopore and membrane/bilayer. The resonant frequency of the nanopore is sensitive to changes in the pore resistance (R_pore). The y-axis plots the real part (Re) of the circuit response as measured by the voltage on the FET gate and plots the imaginary part (Im) as well. The x-axis plots the frequency of the AC source or of the signal as measured by the FET. In certain embodiments, the resonant frequency of the nanopore and membrane/bilayer can be determined when the real part (Re) is sensitive to changes in the AC voltage frequency or at or near an inflection point. In certain embodiments, the resonant frequency of the nanopore and membrane/bilayer circuit response can be determined by the imaginary part (Im), relating to phase shift, is at or near a maximum level.

In the example of FIG. 11A, the gate area of the FET is about 1.0 um$^2$, the membrane/bilayer area is about 1.0 um$^2$, and the gate capacitance density is about 17 ff/um$^2$. The resonant frequency of the nanopore and membrane/bilayer is when the pore resistance is 1.0 GOhm is shifted higher in comparison when the pore resistance if 1.5 GOhm.

In the example of FIG. 11B, the gate area of the FET is about 0.25 um$^2$, the membrane/bilayer area is about 0.25 um$^2$, and the gate capacitance density is about 17 ff/um$^2$. The resonant frequency of the nanopore and membrane/bilayer when the pore resistance is 1.0 GOhm is shifted higher in comparison when the pore resistance if 1.5 GOhm.

In the example of FIG. 11C, the gate area of the FET is about 3.50 um$^2$, the membrane/bilayer area is about 100.00 um$^2$, and the gate capacitance density is about 17 ff/um$^2$. The resonant frequency of the nanopore and membrane/bilayer when the pore resistance is 1.0 GOhm is shifted higher in comparison when the pore resistance if 1.5 GOhm.

FIGS. 11A-11C show that changes in the resonant frequency of the nanopore and membrane/bilayer due to the change in resistance of the nanopore can be utilized to detect a sequenced base which changes the resistance of the nanopore.

Figure 12A:
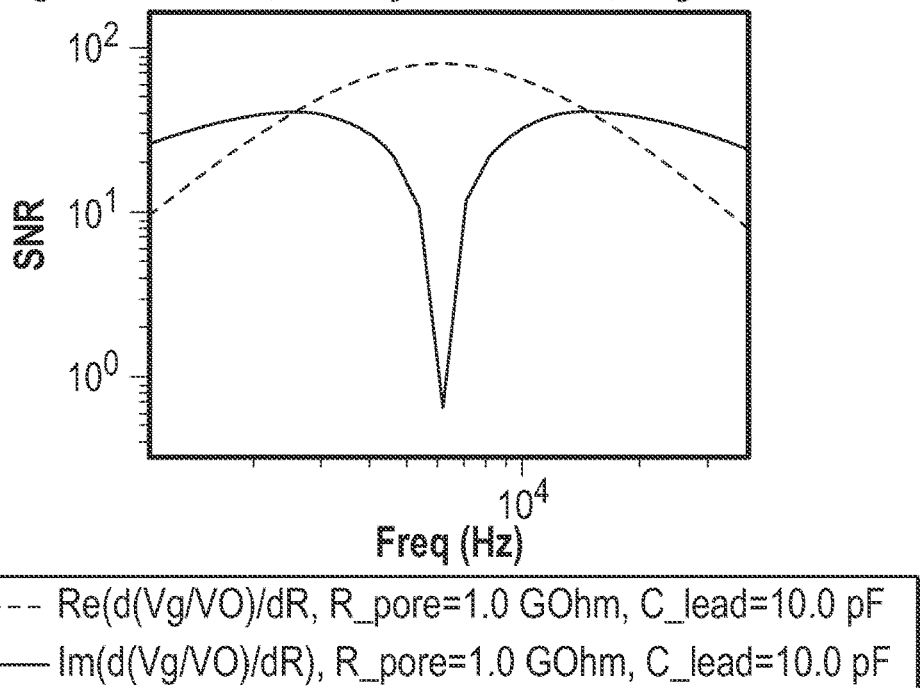
FIG. 12A, FIG. 12B and FIG. 12C plot the signal-to-noise ratio of the response of the circuit shown in FIG. 9.
Figure 12B:
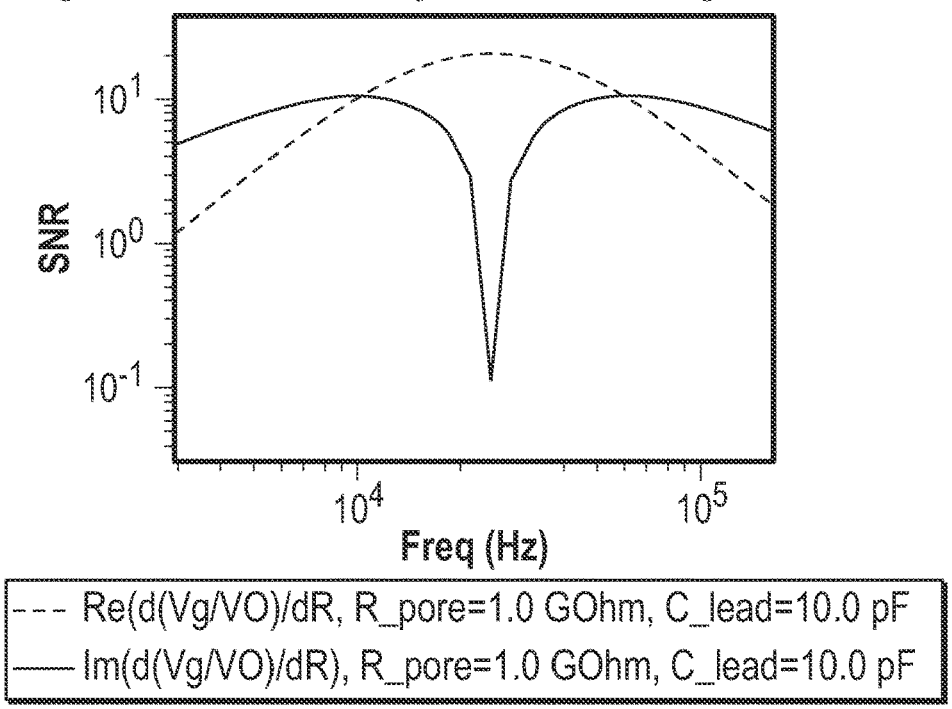
Figure 12C:
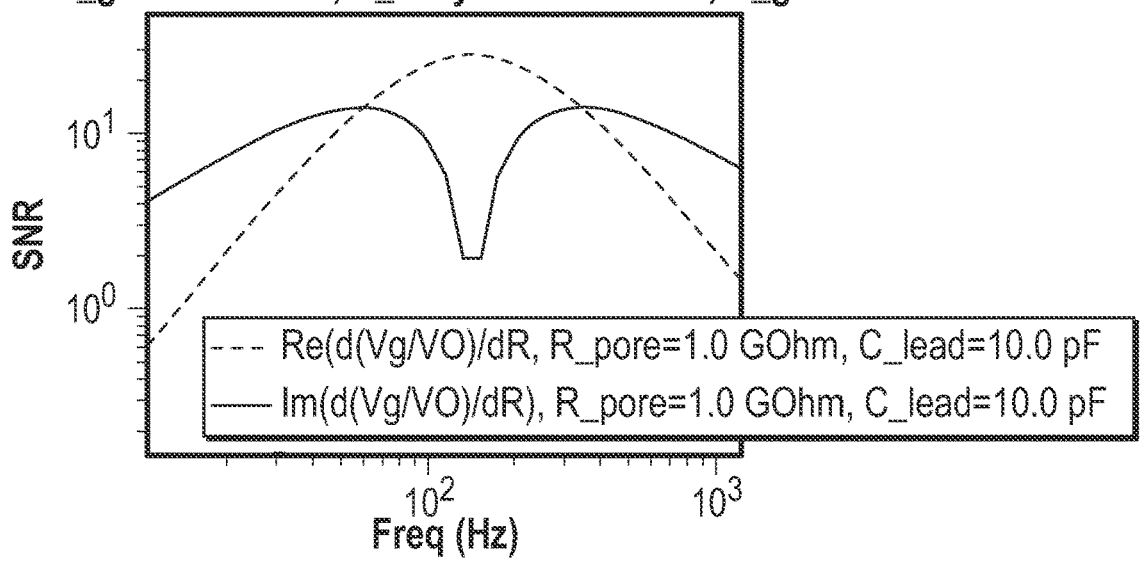

FIG. 12A, FIG. 12B and FIG. 12C shows that the signal-to-noise ratio of the response change with respect to changes in size and capacitance of the FET gate and/or of the lipid bilayer. The signal-to-noise ratio as shown is proportional to the differentiation of the FET measured response with respect to pore resistance (R_pore).

Figure 13:
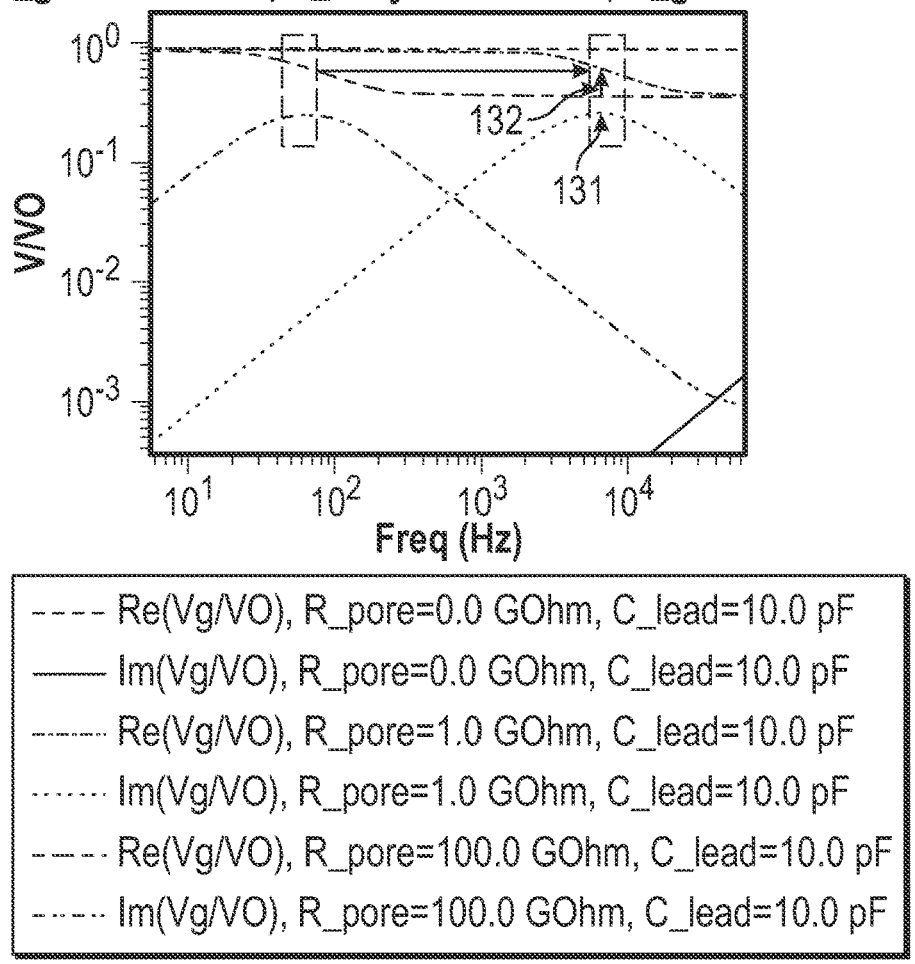
FIG. 13 shows the circuit response in different scenarios relating to FIG. 9.

FIG. 13 shows examples that the circuit response can distinguish between the scenarios with no bilayer, with bilayer only, or with both nanopore and bilayer. The y-axis plots the real part (Re) of the circuit response as measured by the voltage on the FET gate and plots the imaginary part (Im) as well. The x-axis plots the frequency of the AC source or of the signal as measured by the FET. In certain embodiments, the resonant frequency of the membrane/bilayer with or without a nanopore can be determined when the real part (Re) is sensitive to changes in the AC voltage frequency or at or near an inflection point. In certain embodiments, the resonant frequency of membrane/bilayer with or without a nanopore can be determined when the imaginary part (Im), relating to phase shift, is at or near a maximum level.

In the example when the pore resistance (R_pore) is 0.0 GOhm, such as when the membrane/bilayer has been damaged and no longer separates the cis cell and trans cell, the circuit response is generally following the AC voltage.

In the example where the pore resistance (R_pore) is 100.0 GOhm, such as when a nanopore has not been incorporated into the membrane/bilayer, the circuit response is sensitive to changes in the AC voltage frequency and is in a resonant state at a frequency of the AC source at about 100 Hz.

In the example where the pore resistance (R_pore) is 1.0 GOhm, such as when a nanopore has been incorporated into the membrane/bilayer, the circuit response is sensitive to changes in the AC voltage frequency and is in a resonant state at a frequency of the AC source at about 10 kHz. The nanopore and membrane/bilayer resonate at a high frequency of the AC source in comparison to a membrane/bilayer being in a resonant state without incorporation of a nanopore.

Point 131 indicates the response at resonant frequency in the scenario having both nanopore and bilayer. Arrow 132 shows that nanopore insertion to the membrane/bilayer shifts the resonant frequency to a higher frequency.

In certain embodiments, the lack of a resonant frequency can be used to determine that the membrane/bilayer is damaged and a particular trans well is defective. In certain embodiments, a relatively low resonant frequency can be used to determine that a nanopore has not been incorporated in the membrane/bilayer. For example, a new nanopore can be introduced into the membrane/bilayer. In certain embodiments, a relatively high resonant frequency can be used to determine that a nanopore has been incorporated in the membrane and a particular trans well is functioning properly.

According to some embodiments, FIGS. 1A-ID schematically illustrate a composition including a tether anchored to or adjacent to a nanopore and configured for use in detecting action of a polymerase upon a nucleotide using a tether anchored to or adjacent to a nanopore responsive to a change in electrical potential across the nanopore. In some cases, the nanopore may be a solid-state nanopore as illustrated in FIG. 1E.

The composition illustrated in FIG. 1A includes nanopore 1800 including first side 1801, second side 1802, aperture 1803 extending through the first and second sides, and constriction 1804 disposed between the first and second sides, permanent tether 1810 including a head region (not specifically labeled) anchored to first side 1801 of nanopore 1800, a tail region (not specifically labeled) that is movable between first side 1801 and second side 1802 of nanopore 1800, and an elongated body (not specifically labeled) that includes reporter region 1814 and moiety 1815: and nucleotide 1830 including an elongated tag (not specifically labeled) that includes moiety 1832 but lacks a reporter region. As illustrated in FIG. 1A, an interaction between moiety 1832 of nucleotide 1830 and moiety 1815 of tether 1810 can dispose reporter region 1814 at a predetermined location relative to the moiety 1832. Optionally, more than one reporter region can be provided, e.g., at least two, or three, or four, or five, or more than five reporter regions. Additionally, moiety 1815 can be located at any suitable position along an elongated tag, e.g., can be located between head region 1811 and reporter region 1814 and adjacent to reporter region 1814 such as illustrated in FIG. 1A, or can be adjacent to head region 1811, adjacent to tail region 1812, or between tail region 1812 and reporter region 1814.

It should be appreciated that the disposition of reporter region 1814 at the predetermined location relative to moiety 1832 can be detectable in any suitable manner. For example, the composition can be in operable communication with a measurement circuit. The measurement circuit can be configured to detect the position of reporter region 1814 relative to moiety 1832. In one illustrative embodiment, nanopore 1800, tether 1810, polymerase 1850, and nucleotide 1830 can be immersed in a conductive fluid, e.g., an aqueous salt solution. A measurement circuit can be in communication with first and second electrodes and can be configured to apply a first voltage between those electrodes so as to apply a voltage across nanopore 1800, as represented by the "+" and "−" signs illustrated in FIG. 1A, and to use the electrodes to measure the magnitude of a current or flux through aperture 1803 at the first voltage. Reporter region 1814 can have a different electrical or flux blockade property than some or all other regions of the elongated body of the tether (not specifically labeled). For example, reporter region 1814 can include an electrostatic charge, while some or all other regions of elongated body can include a different electrostatic charge, or can be uncharged (e.g., can be electrically neutral). Or, for example, reporter region 1814 can be uncharged, while some or all other regions of the elongated body can include an electrostatic charge. In one illustrative, nonlimiting example, the elongated body of the tether includes a polynucleotide that includes one or more abasic nucleotides that define reporter region 1814. The magnitude of the current or flux through aperture 1803 can measurably change responsive to the relative location of reporter region 1814 within aperture 1803, and such relative location can be based upon the applied voltage and on the location of reporter region 1814 relative to moiety 1832, which in turn can be based on the action of polymerase 1850 upon nucleotide 1830.

More specifically, the measurement circuit further can be configured to change the applied voltage across nanopore 1800 to a second voltage, e.g., by reversing the applied voltage such as represented by the reversal of the "+" and "−" signs such as illustrated in FIG. 1B. Such a change in applied voltage can cause movement of interacting moieties 1815, 1832 within aperture 1803 of nanopore 1800. For example, as illustrated in FIG. 1B, the change in applied voltage can move interacting moieties 1815, 1832 adjacent to constriction 1804, and can dispose reporter region 1814 adjacent to or within constriction 1804. The measurement circuit can be configured to use the electrodes to measure the magnitude of a current or flux through aperture 1803 at the second voltage. It can be seen that the current or flux at the first voltage is different than the current or flux at the second voltage, and such current or flux can be based upon the second voltage and on the location of reporter region 1814 relative to moiety 1832, which in turn can be based on the action of polymerase 1850 upon nucleotide 1830.

The action of polymerase 1850 upon nucleotide 1830 can be individually identifiable based on a measured (e.g., optically or electrically measured) magnitude or time duration, or both, of a signal generated by such a system. For example, the action of polymerase 1850 upon nucleotide 1830 can cause interaction between moieties 1815 and 1832, which in turn causes reporter region 1814 to become disposed at a first location relative to moiety 1832, and the presence of reporter region 1814 at the first location causes the signal, e.g., current or flux through aperture 1803, to have a first magnitude. As such, the signal having the first magnitude correlates to the action of polymerase 1850 upon nucleotide 1830 having occurred. Note that a duplex formed between moiety 1815 and moiety 1832 can be sufficiently large as to inhibit movement of the duplex through the constriction, e.g., under the second voltage.

As illustrated in FIG. 1C, in some embodiments, continued application of the second voltage can cause moiety 1815 to dissociate from moiety 1832. Such dissociation can be considered to "interrupt" a duplex formed between moiety 1815 and moiety 1832. In some embodiments, reporter region 1814 or moiety 1815, or both, can move through constriction 1804 so as to be disposed on second side 1802 of nanopore 1800. Moiety 1832 can be configured so as to remain disposed on the first side of nanopore 1800 even if moiety 1815 becomes disposed on the second side of nanopore 1800, so as to temporarily inhibit interaction between moieties 1815 and 1832. As illustrated in FIG. 1D, following such dissociation, the voltage applied across aperture 1803 can again be changed, e.g., can be changed back to the first voltage, responsive to which moieties 1815 and 1832 can interact with one another.

Note that in some embodiments, the respective lengths of the elongated body of the tether and the elongated tag of the nucleotide, the respective locations of moieties 1815 and 1832, and the respective location of reporter region 1814 are co-selected so as to inhibit the application of force to nucleotide 1830 while the nucleotide is being acted upon by polymerase 1850, and thus to inhibit or preclude such a force from modifying the performance of the polymerase. In one illustrative embodiment, the interaction between moiety 1815 and moiety 1832 forms a duplex. The length of the elongated body of the tether, and the location of moiety 1815 along the elongated body, can be co-selected such that moiety 1815 can be extended through constriction 1804 responsive to an appropriate applied voltage, e.g., so as to cause dissociation between moiety 1815 and moiety 1832. The length of the elongated tag of the nucleotide, and the location of moiety 1832 along the elongated tag, can be co-selected so as to provide additional slack such that elongated tag need not be pulled taut in order to dispose reporter region 1814 adjacent to constriction 1804 under the second applied voltage. The size of the duplex 1815, 1832 can inhibit movement of the duplex through constriction 1804, and can shield the nucleotide from forces that otherwise may have been applied to nucleotide 1830 via elongated tag 1831. Additionally, the relative locations of reporter region 1814 and moieties 1815 and 1832 can be co-selected so as to dispose reporter region 1814 at a suitable location relative to constriction 1804 under the second voltage so as to facilitate detection of the reporter region when moieties 1815 and 1832 interact with one another. In one exemplary embodiment, reporter region 1814 is disposed at a suitable location along elongated body 1831 so as to be disposed within, or adjacent to, constriction 1804 of nanopore 1800 when moieties 1815 and 1832 interact with one another responsive to action of polymerase 1850.

According to some embodiments, FIGS. 2A-2F schematically illustrate a composition including a tether anchored adjacent to a biological nanopore and configured for use in detecting action of a polymerase upon a first nucleotide using a change in applied voltage across the nanopore.

More specifically, FIG. 2A illustrates a composition including nanopore 2200 including first side 2201, second side 2202, aperture 2203 extending through the first and second sides, and constriction 2204 disposed between the first and second sides. Illustratively, nanopore 2200 can include a biological pore, such as a MspA nanopore (e.g., M2-NNN MspA mutant), disposed in a barrier, such as a membrane of biological origin (e.g., a lipid bilayer) or a solid state membrane. The composition illustrated in FIG. 2A further includes tether 2210 including head region 2211, tail region 2212, and elongated body 2213 disposed therebetween. Head region 2211 is suitably anchored to polymerase 2250, e.g., using any suitable attachment provided herein or otherwise known in the art. Elongated body 2213 of tether 2210 can include a moiety 2214. Illustratively, elongated body 2213 can include a polynucleotide, and a first subset of the nucleic acids of the polynucleotide can define moiety 2214. Additionally, tail region 2212 can include at least one charged atom such that, based upon a voltage being applied across nanopore 2200 illustrated in FIG. 2A during step 1, such voltage generates a first directional force F1 that causes translocation of tail region 2212 through aperture 2203 and past constriction 2204 such that a portion of elongated tail 2213 becomes disposed within aperture 2203 and tail region becomes disposed beyond second side 2202 of nanopore 2200 in a manner such as illustrated in FIG. 2B. Such directional force F1 also causes translocation of polymerase 2250 towards second side 2202 of nanopore 2200 until polymerase 2250 comes to rest on or adjacent to first side 2201 of nanopore 2200 in a manner such as illustrated in FIG. 2B, preventing or inhibiting further movement of polymerase 2250 under directional force F1. Note that polymerase optionally can be partially disposed within aperture 2203 of nanopore 2200.

The composition illustrated in FIG. 2A also can include another member 2250' to which tail region 2212 of tether 2210 can attach. For example, the composition illustrated in FIG. 2A can include one or more polynucleotides 2250' having a sequence that suitably can hybridize to corresponding nucleic acids on elongated body 2213 or on tail region 2212 of tether 2210. For example, as illustrated in FIG. 2B, under directional force F1 that is applied during step 1 (FIG. 2A) and can continue during step 2 (FIG. 2B), tail region 2212 becomes disposed beyond second side 2202 of nanopore 2200 and becomes attached to, e.g., hybridizes with member 2250', e.g., a complimentary piece of DNA ("capture-DNA") present adjacent to second side 2202 (e.g., on the trans side) of nanopore 2200. The bond between tail region 2212 and member 2250', e.g., hybridization between one or more first nucleic acids of tail region 2212 and one or more second nucleic acids of member 2250' so as to form a duplex 2212, 2250', e.g., double stranded DNA, is sufficiently strong so that upon application of a reverse directional force F2 (e.g., during step 3 illustrated in FIG. 2C), e.g., reversal of the voltage, the duplex inhibits separation of the polymerase from the nanopore and, as such, the polymerase remains captured at the nanopore. For example, duplex 2212, 2250' can include a sufficient number of hybridized nucleic acids such that the duplex does not dissociate under application of force F2. Additionally, the duplex 2212, 2250' can be sufficiently large as to inhibit movement of the duplex through constriction 2204. Additionally, in some embodiments, the lateral dimensions of constriction 2204 of nanopore 2200 are selected such that only a single elongated body 2213 of a single tether 2210 can be disposed therethrough, thus assuring that only one polymerase 2250 becomes captured at the nanopore.

In particular embodiments, a quality assessment step can be utilized to evaluate the nanopore or the capture of polymerase at the nanopore. A nanopore that is properly embedded in a membrane can produce a characteristic current or flux pattern that is distinguishable from the current or flux pattern that results when no nanopore is present in the membrane or when a nanopore is not fully functional. In the event that a quality assessment indicates that a nanopore is not properly embedded in a membrane, the steps used to load the nanopore can be repeated.

A polymerase that is properly captured by a nanopore can also produce a characteristic current or flux pattern. For example, a bias voltage that is applied to a nanopore that has captured a polymerase via a tether can produce a current or flux pattern that is indicative of interaction between the nanopore aperture and signature bases in a nucleic acid tether. Bias voltages can be applied in opposite directions to determine whether the tether has desired mobility in the nanopore lumen such that signature bases interact with the aperture as predicted. In the event that a quality assessment indicates that a polymerase has not been properly captured by a nanopore, the polymerase can be stripped, for example by application of a strong reverse bias, and steps used to capture the polymerase at the nanopore can be repeated.

In another optional quality assessment routine, a relatively large reverse bias voltage can be applied to the system to determine if the polymerase and tether are removed from the nanopore. Typically, the duplex formed between member 2250' and 2212 will be sufficiently strong to prevent removal of the tether. This quality assessment routine will indicate if this is the case. Similarly, bias voltages can be applied at this stage and the resulting current or flux patterns detected to determine if corking or uncorking occurs as set forth previously herein. In the event that a quality assessment indicates that a polymerase has not been captured by a nanopore with sufficient stability, steps used to capture the polymerase at the nanopore can be repeated.

Several embodiments set forth herein relate to multiplex devices that are loaded with multiple nanopores each of which is desired to attach to a polymerase. Quality assessment steps, such as those set forth above, can be carried out for the multiplex population. If a desired number of functional nanopores have not been formed in a multiplex nanopore apparatus or if the fractional loading is not sufficient, then the apparatus can be treated in bulk to repeat nanopore (or polymerase) loading. Optionally, the nanopores (or polymerases) can be removed prior to repeating the loading step, for example, if faulty nanopores or polymerases are present. For example, repetition of loading (and optionally removal of nanopores or polymerases) can be carried out if the multiplex apparatus is loaded at fewer than 90%, 75%, 50%, 30% or fewer of the expected sites.

At step 3 illustrated in FIG. 2C, the composition illustrated in FIG. 2B further can be subjected to a reverse directional force F2, e.g., reversal of the voltage relative to that of steps 1 and 2, based upon which polymerase 2250 can come out of contact with first side 2201 of nanopore 2200, and can be contacted with sequencing primer 2280, target single stranded DNA 2270 (target), and a plurality of nucleotides 2230, 2230', each of which includes a corresponding elongated tag 2231, 2231' including a corresponding moiety 2232, 2232' that interacts with the moiety of tether 2213 responsive to polymerase 2250 acting upon that nucleotide 2230 or 2230'.

At step 4 illustrated in FIG. 2D, based upon the sequence of target 2270, polymerase 2250 acts upon first nucleotide 2230, based upon which the corresponding moiety 2232 of elongated tag 2231 of nucleotide 2230 interacts with moiety 2214 of tether 2310. For example, polymerase 2250 can preferentially bind first nucleotide 2230 relative to second nucleotide 2230' based upon first nucleotide 2230 being complementary to a next nucleotide in the sequence of target 2270. Additionally, elongated tag 2231 can include a first nucleotide sequence, and moiety 2214 of elongated body 2213 can include a second nucleotide sequence that is complementary to the first nucleotide sequence of elongated tag 2231, such that the first nucleotide sequence and the second nucleotide sequence hybridize to one another. Note that step 4 can be performed under reverse directional force F2, e.g., reversal of the voltage relative to that of steps 1 and 2, so that polymerase 2250 need not be disposed against first side 2201 of nanopore 2200.

At step 5 illustrated in FIG. 2E, directional force F1 again can be applied, which can cause translocation of tail region 2212 in a direction away from first side 2201 of nanopore 220 and translocation of polymerase 2250 towards second side 2202 of nanopore 2200. For example, a voltage across nanopore 2200 again can be reversed. However, application of force F1 at step 5 may not necessarily cause polymerase 2250 to come to rest on or adjacent to first side 2201 of nanopore 2200 in a manner such as illustrated in FIG. 2B. Instead, application of force F1 (pulling towards trans) can cause a duplex defined by the interaction (e.g., binding or hybridization) between moiety 2214 and 2232 to come to rest on or adjacent to constriction 2204. Illustratively, the composition can be included in a system that includes measurement circuitry configured to measure a current or flux through constriction 2204. During step 5, the current or flux can be based on first moiety 2232, e.g., based upon the particular sequence of moiety 2232, and first nucleotide 2230 can be identifiable based upon the current or flux. For example, moiety 2232 of first nucleotide 2230 can have a different sequence than that of moiety 2232' of second nucleotide 2230', and can bind to a different portion (moiety) of elongated body 2213 of tether 2210. Illustratively, the elongated tags can include any suitable polynucleotide sequence that facilitates distinguishing from one another nucleotides to which such tags are attached.

At step 6 illustrated in FIG. 2F, under continued application of directional force F1, after a stochastic time the duplex between moiety 2214 of tether 2210 and moiety 2232 of elongated tag 2231 of nucleotide 2230 dissociates in a manner analogous to that described in Derrington et al., PNAS 2010, cited elsewhere herein. Following such dissociation, directional force F1 can cause polymerase 2250 to come to rest on or adjacent to first side 2201 of nanopore 2200 in a manner such as illustrated in FIG. 2B.

Note that other configurations suitably can be used. For example, alternatively to steps 5 and 6 respectively illustrated in FIGS. 2E and 2F, elongated tag 2231 instead can be sufficiently short that the duplex between moiety 2214 of tether 2210 and moiety 2232 of elongated tag 2231 of nucleotide 2230 does not reach the constriction under application of directional force F1, and instead polymerase 2250 comes to rest on or adjacent to first side 2201 of nanopore 2200 in a manner such as illustrated in FIG. 2B. In such embodiments, the elongated tags 2231, 2231' attached to different nucleotides 2230, 2230' that can be bound by polymerase 2250 can include moieties 2232, 2232' that are different sequences or lengths than one another and thus interact differently with, e.g., hybridize differently with, moiety 2214 of tether 2210 than one another so as to cause different changes in the length of tether 2214. The corresponding nucleotides 2230, 2230' can be identified based on changes in current or flux based on the length of tether 2210 caused by interactions between moiety 2214 and the corresponding moiety 2232, 2232'. Steps 4-6 analogous to those illustrated in FIGS. 2D-2F can be repeated, therefore applying AC-voltage preserving the electrodes. In yet another embodiment, the elongated tag or the elongated body can include a reporter region such as provided elsewhere herein, and the current or flux through aperture 2203 can be based on the reporter region being disposed within the aperture, and nucleotide 2230 can be identifiable based on the current or flux.

Additionally, should a dysfunctional polymerase be captured, one can reverse the voltage to a very high voltage so that the capture DNA comes off and a new polymerase can be captured (repeating steps 1-3).

Voltage, current, or optical waveforms can be measured for various states of a tether that passes through a nanopore. The voltage, current, or optical waveforms can be useful for determining results of an analytical method carried out on a nanopore system. For example, the waveforms can be fit to data to increase accuracy of sequencing reads.

In one embodiment, to begin sequencing of the template DNA, the disclosed method can apply a positive relative potential to the trans electrode to pull the polymer tether such that the DNA polymerase moves to the vicinity of the nanopore. The polymer tether may be a single-stranded DNA which contains an abasic segment. As the DNA polymerase incorporates tagged nucleotides to base-pair with the template DNA, the identities of the tagged nucleotides can be determined. Each tagged nucleotide being incorporated by the DNA polymerase may have a unique tag. The unique tag can bind (e.g., hybridize) to a unique region of the polymer tether which has a unique distance from the abasic segment, such that the location of the abasic segment relative to the nanopore can be uniquely determined. The unique location of the abasic segment relative to the nanopore can result in a unique ionic current blockade at the nanopore, and therefore a unique nanopore resistance. To read out the identity of the tagged nucleotide, the disclosed method can apply an AC voltage. By applying an AC voltage, the system may have a non-Faradaic, capacitive response, and may not have a net electrochemical reaction. In some embodiments, by measuring the FET gate voltage waveform which depends on the unique nanopore resistance, one can determine the unique identity of the tagged nucleotide. Compared to reading out the identity of the tagged nucleotide by applying a DC voltage, which requires waiting for the transient response to decay away, using an AC voltage may allow for a faster readout. Measurement sensitivity may be improved if the AC voltage frequency is at around the resonant frequency of the nanopore and membrane/bilayer which maximizes the response sensitivity to changes in the resistivity of the nanopore. After determining the identity of the tagged nucleotide, the disclosed method can apply another a greater positive relative potential to the trans electrode to increase the pull force on the polymer tether, such that the tag dissociates from the polymer tether. In some embodiments, the disclosed method may be used to detect proteins or other types of biopolymers.

According to some embodiments, FIGS. 3A-3C schematically illustrate a nanopore formed with ionophores. A single polymerase 3010 may be anchored into a membrane 3020. The membrane may be a lipid monolayer or a lipid bilayer. The polymerase can be anchored using a membrane-spanning peptide (MSP) 3011, and this peptide can be anchored to the underlying surface. One half (gB) 3030 of an ionophore (e.g., gramicidin) may be conjugated via a tether to the MSP—this half resides on the trans side of the membrane. The purpose of this tether is to localize gB to the polymerase, and to the trans side. Other methods of localizing gB close to the polymerase on the trans side include anchoring gB to the surface, or using asymmetric bilayers where gB has characteristics that favor the trans-side bilayer. The polymerase may interact with a template polynucleotide 3002 and a primer 3001, which may not pass through the pore. Gamma phosphate labeled nucleotide 3003 may be attached to the other half of the gramicidin dimer (gA) 3031—this is on the cis side. When the nucleotide sits in the polymerase active site, a dimer 3040 may be formed from the two halves of the gramicin, opening up a nanopore or ion channel permitting current 3050 to flow. Simple modifications to the gramicidin peptide sequence may affect the current flow, so four different modifications can permit four different signals. The two halves of the gramicin can be engineered to have fast off-rates, so after the gamma phosphate linkage is cleaved, gA will diffuse away into the bulk. Note that one gA alone may not span the entire membrane to permit ion flow. To read out the identity of the labeled nucleotide, the disclosed method can apply an AC voltage. By applying an AC voltage, the system may have a non-Faradaic, capacitive response, and may not have a net electrochemical reaction. In some embodiments, by measuring the AC response waveform which depends on the four different modifications, one can determine the unique identity of the labeled nucleotide.

Additional details of the embodiments can be found in U.S. Ser. No. 10/364,463B2, Liu, Zewen, et al. "Solid-state nanopore-based DNA sequencing technology." Journal of Nanomaterials 2016 (2016), the entirety of each of the disclosures is incorporated herein by reference.

Alternative Embodiments

One aspect of the disclosed technology relates to using the molecular of interest as part of a molecular bridge that conduct electricity. In one embodiment, the disclosed system includes a nanogap and a molecular bridge extending across the nanogap. A slab of dielectric may also extend across the nanogap to act as a capacitor. When the molecule of interest interacts (e.g., hybridizes) with the molecular bridge, it may result in a well-defined change in the electrical conductivity of the molecular bridge. The molecular bridge may be a partially double-stranded DNA, a DNA origami, a carbon nanotube, or other molecular wires, and may contain nanoparticles. This disclosed system can be used to identify a great variety of molecules, e.g., different nucleotides or amino acids.

Figure 7:
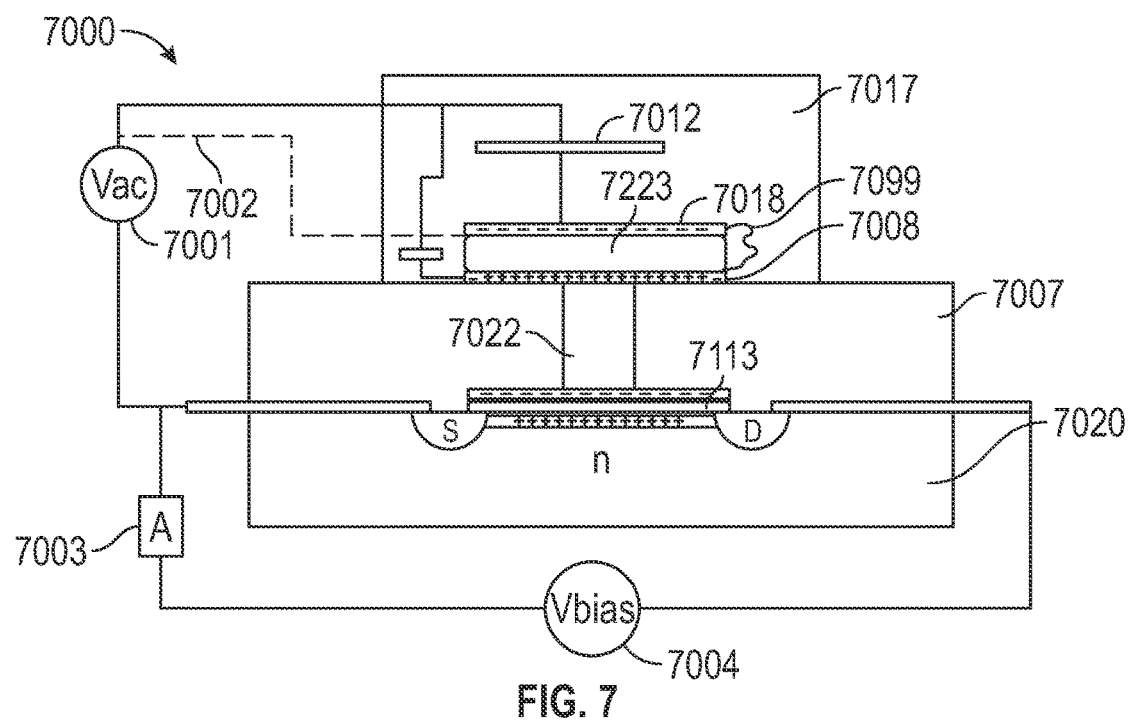
FIG. 7 schematically illustrates an embodiment including a molecular bridge and an AC electrical source.

One embodiment of the disclosed system is illustrated in FIG. 7. In FIG. 7, a sensor device 7000 for identifying nucleotides is shown. The sensor device 7000 may include an electrode 7012. The sensor device 7000 may further include a FET 7020 having a gate oxide 7113. The sensor device 7000 may further include a molecular bridge, e.g., a partially double-stranded nucleic acid polymer 7099 in a flow chamber 7017. The molecular bridge 7099 may have one end operably coupled to the electrode 7012, e.g., via a top metal surface 7018, and the other end operably coupled to the gate terminal of the FET 7020, e.g., via a bottom metal surface 7008 and a metal interconnect 7022 buried in a thick insulator 7007. A cap dielectric 7223 and the metal surfaces 7008 and 7018 may to form a capacitor connected in parallel with the partially double-stranded nucleic acid polymer 7099. The cap dielectric 7223 may be about a few nm, 10 nm, 20 nm, 30 nm, 40 nm, 50 nm, 60 nm, 70 nm, 80 nm, or 90 nm in thickness.

The sensor device 7000 may further include an electrical source 7001 configured to provide an AC input between the electrode and the source terminal of the FET. The sensor device 7000 may further include an additional electrode 7002 for applying the AC input. A bias voltage 7004 may be applied across the source and drain terminals of the FET. The sensor device 7000 may further include a controller 7003 operably coupled to the FET, the controller configured to measure an AC response of the FET, wherein the AC response depends on the identity of a nucleotide interacting with the partially double-stranded nucleic acid polymer 7099.

Figure 8:
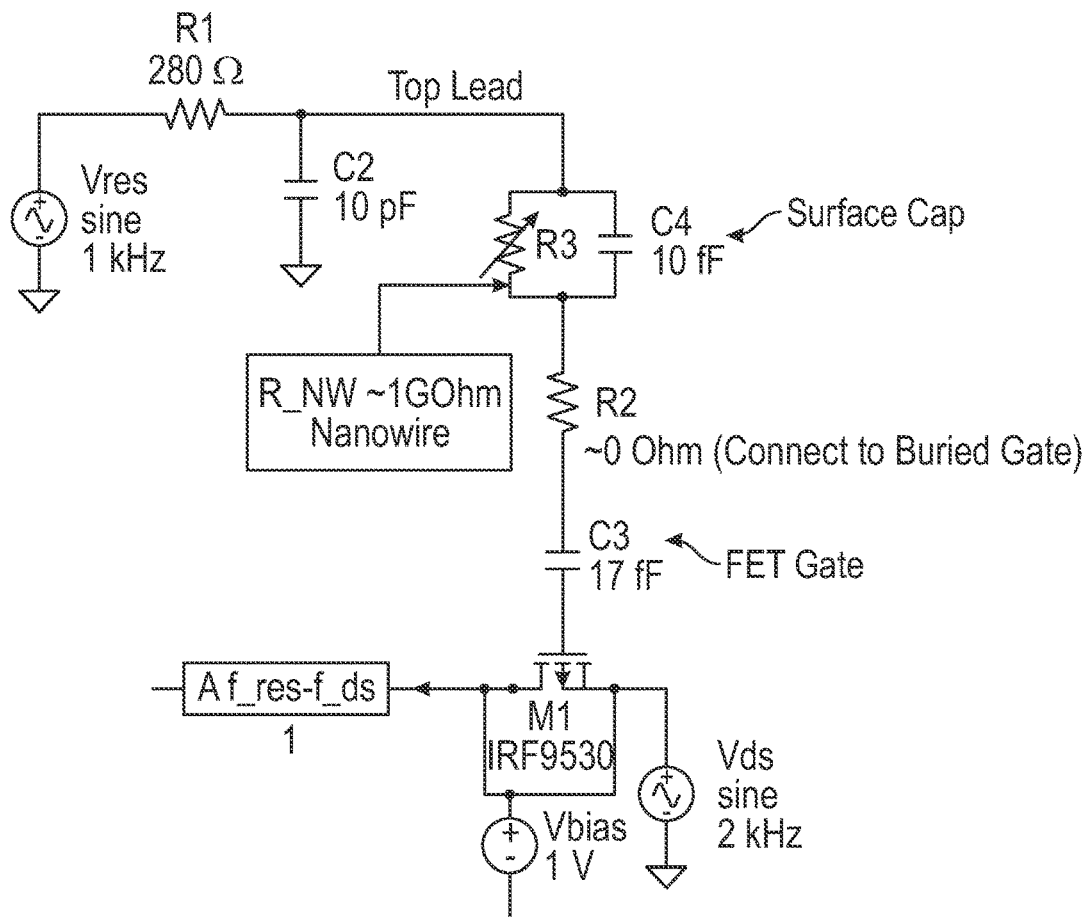
FIG. 8 shows an equivalent circuit for the embodiment of FIG. 7.

FIG. 15A and FIG. 15B illustrate exemplary AC response waveforms, such as the response waveforms as measured by the controller in FIG. 6, by the controller 7003 of FIG. 7, or the controller of other suitable sensor devices. Changes to the electrical conduction of the molecular bridge 7099 may cause amplitude and phase modulation of the waveforms as shown in FIG. 15B. In some cases, the controller is configured to measure changes of the amplitudes of the AC responses, e.g., as shown in comparing points 153 and 154 in FIG. 15B. For example, the amplitude may be obtained by comparing the maximal and minimal points 151 and 152 in FIG. 15B. In some cases, the controller is configured to measure a change of the waveform shape of the AC response. In some cases, the electrical source 7001 is configured to provide an AC voltage in a sinusoidal, rectangular, triangular, saw-tooth, or another suitable waveform alternating between a positive potential and a negative potential. In some cases, electrical conduction through the partially double-stranded nucleic acid polymer 7099 is modulated by a nucleic acid label on a nucleotide being incorporated to a polynucleotide, the nucleic acid label being partially complementary to the partially double-stranded nucleic acid polymer. FIG. 8 shows an equivalent circuit of the sensor device 7000.

Figure 14A:
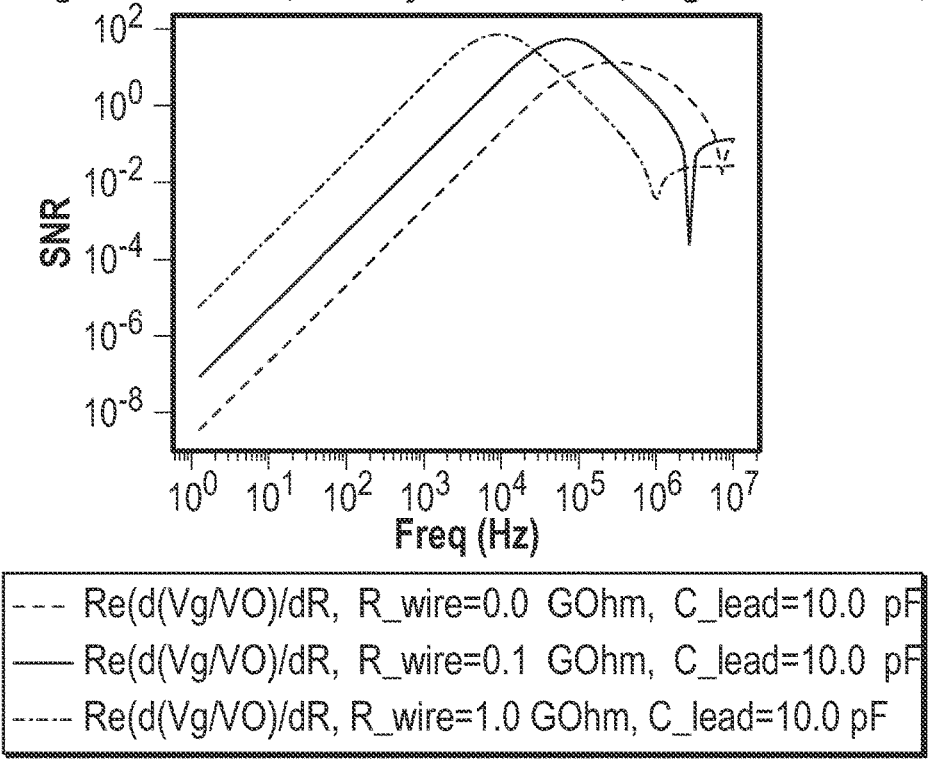
FIG. 14A and FIG. 14B show the signal-to-noise ratio of the response of the circuit shown in FIG. 8.
Figure 14B:
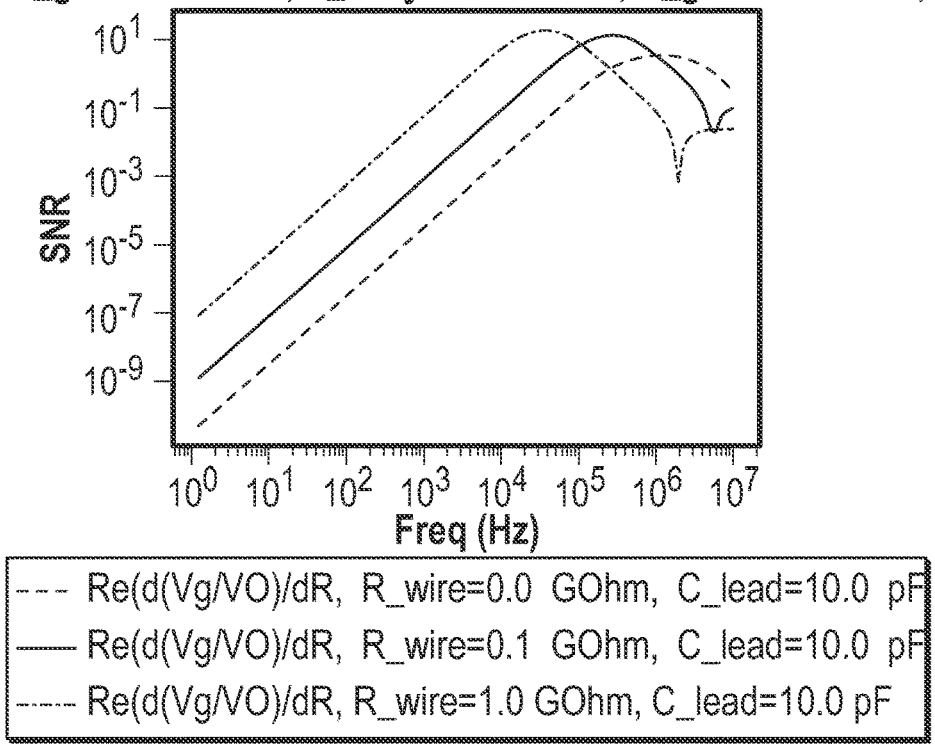

FIG. 14A and FIG. 14B show the signal-to-noise ratio of the response of the circuit shown in FIG. 8. In the example of FIG. 14A, the area of the FET gate is about 1.00 um$^2$ and the gate capacitance density of the FET 7020 is about 17 ff/um$^2$. The resonant frequency of the molecular bridge 7099 is at or near the peak of the SNR. As shown in FIG. 14A, as the resistance of the molecular bridge (R_wire) decreases the resonant frequency of the molecular bridge increases. Therefore, changes in the resonant frequency of the molecular bridge can be utilized to detect a sequenced base which changes the resistance of the molecular bridge. In the example of FIG. 14B, the area of the FET gate is about 0.25 um$^2$ and the gate capacitance density of the FET 7020 is about 17 ff/um$^2$. The resonant frequency of the molecular bridge 7099 is at or near the peak of the SNR As shown in FIG. 14B, as the resistance of the molecular bridge (R_wire) decreases the resonant frequency of the molecular bridge increases. Therefore, changes in the resonant frequency of the molecular bridge can be utilized to detect a sequenced base which changes the resistance of the molecular bridge.

Figure 4:
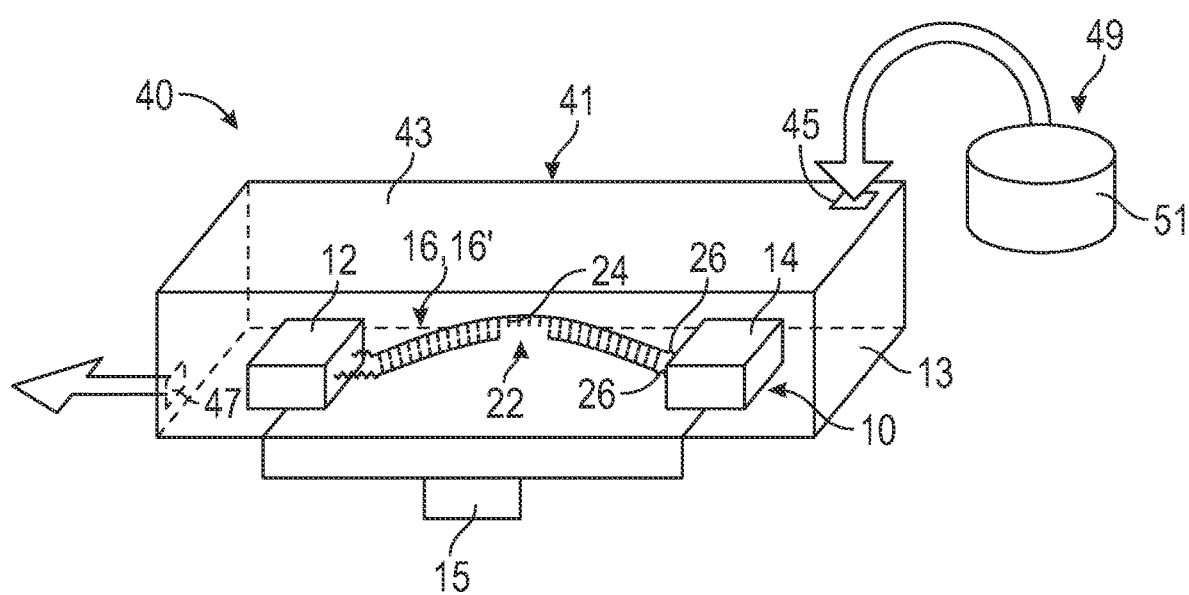
FIG. 4 is a schematic diagram of an example of a sensing system including a molecular bridge sensor.

According to some embodiments, a sensing system 40 shown in FIG. 4 includes a flow cell 41 and an electronic sensor 10 integrated into the flow cell 41. The electronic sensor 10 includes two electrodes 12, 14; a modified, partially double stranded nucleic acid polymer 16 bridging the two electrodes 12, 14, the modified, partially double stranded nucleic acid polymer 16 including two polynucleotide chains 18, 20 partially bonded (via hydrogen bonding) together, a gap 22 in a first 18 of the polynucleotide chains wherein nucleotides are missing; and a plurality of nucleotide bases 24 of a second 20 of the polynucleotide chains exposed at the gap 22. The flow cell 41 is a vessel that contains the sensor 10. It is to be understood that other vessels, such as a well, tube, channel, cuvette, Petri plate, bottle, or the like may alternatively contain the sensor 10. Cyclic processes, such as nucleic acid sequencing reactions, are particularly well suited for flow cells 41.

Example flow cells 41 include a substrate/support 13 and a lid bonded directly or indirectly thereto or integrally formed therewith. Flow cell 41 may include a fluid inlet 45 and a fluid outlet 47 that enable delivery of bulk reagents to one sensor 10 or an array of sensors 10 contained within the flow cell 41.

The sensing system 40 may also include a reagent delivery system 49 to selectively introduce a reagent to an input (e.g., fluid inlet 45) of the flow cell 41, over the sensor 10, and then out of the fluid outlet 47. The reagent delivery system 49 may include tubing or other fluidics that can permanently or removably attach to the fluid inlet 45. The reagent deliver system 49 may include a sample container 51. The reagent (including the labeled nucleotide 30 to be introduced to the electronic sensor 10) may be stored in the sample container or prepared and introduced to the sample container just before use. The reagent deliver system 49 may also include a pump or other suitable equipment to retrieve the reagent from the sample container 51 and deliver it to the fluid inlet 45. In other examples, the sample container 51 is positioned so the reagent can flow by gravity to the fluid inlet 45, over the sensor 10, and out the fluid outlet 47. The sensor 10 in the flow cell 41 may also be operatively connected to a detector 15 to detect conductivity changes of the sensor 10 when the sensing system 40 is used.

Figure 5:
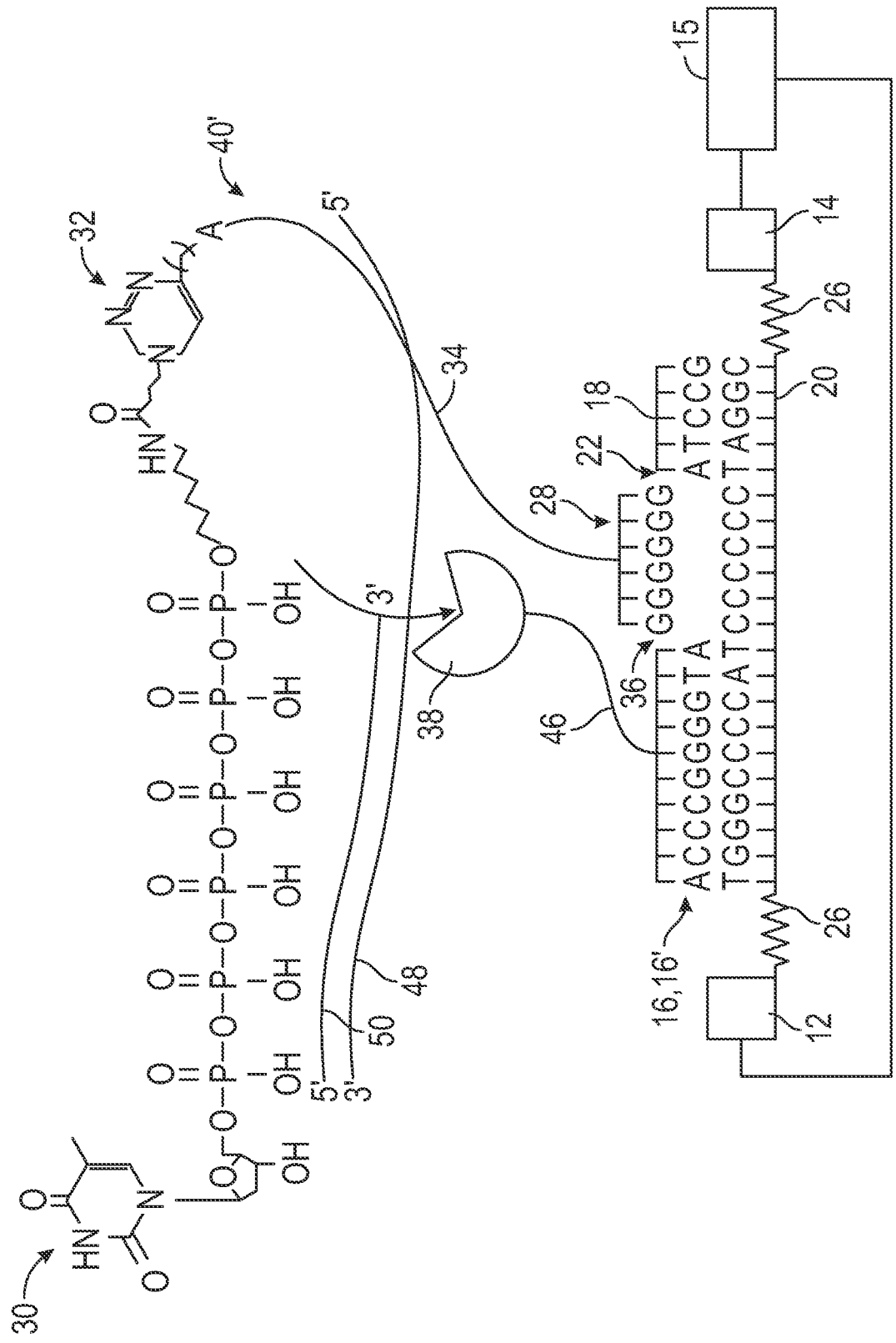
FIG. 5 is schematic diagram of another example of a molecular bridge sensing system.

According to some embodiments, a system 40' is shown in FIG. 5 and includes an electronic sensor 10, which includes two electrodes 12, 14; a modified, partially double stranded nucleic acid polymer 16 bridging the two electrodes 12, 14, the modified, partially double stranded nucleic acid polymer 16 including two polynucleotide chains 18, 20 partially bonded (via hydrogen bonding) together, a gap 22 in a first 18 of the polynucleotide chains wherein nucleotides are missing; and a plurality of nucleotide bases 24 of a second 20 of the polynucleotide chains exposed at the gap 22; and separate reagents that are to be introduced to the electronic sensor 10, the reagents including labeled nucleotides 30, at least one of the labeled nucleotides 30 including a nucleotide 32, a linking molecule 34 attached to a phosphate group of the nucleotide, a switch strand 28 attached to the linking molecule 34, the switch strand 28 including a strand of nucleotides including bases 36 complementary to at least some of the plurality of nucleotide bases 24 exposed at the gap 22. In the example shown in FIG. 5, the polynucleotide chain 18 is ACCGGGGTA-gap-ATCCG and the polynucleotide chain 20 is TGGGCCC-CATCCCCCCTAGGC (SEQ. ID No. 1). In the polynucleotide chain 20, the nucleotide bases "CCCCCC" are exposed at the gap 22 (at least until a switch strand 28 is associated therewith).

While not shown, it is to be understood that the sensor 10 may be positioned within or part of a vessel, such as flow cell 41 (FIG. 4), a tube, channel, cuvette, Petri plate, bottle, or the like. Another example of a suitable vessel is a flow cell.

While one sensor 10 is shown in FIG. 5, it is to be understood that the sensing system 40' may include an array of sensors 10 positioned on a substrate. Moreover, the sensor(s) 10 of the sensing system 40' may each be electrically connected to a respective detector 15 to detect a response from the electrical sensor 10 when the switch strand 28 is associated at the gap 22.

Some examples of the sensing system 40' further include a polymerase 38 anchored to the modified dsNA 16', and a template polynucleotide chain 48 that is to be introduced to the sensor 10.

As shown in FIG. 5, the sensor 10 includes the polymerase 38. Any DNA polymerase may be used that can catalyze the addition of one nucleotide at a time to the nascent strand. The DNA polymerase may be from any of the following families: A, B, C, D, X, Y, and RT. Specific examples from family A include T7 DNA polymerase, Pol I, Pol γ, Pol Θ, or Pol ν; or from family B include Pol II, Pol B, Pol ζ, Pol α, Pol δ, and Pol ε; or from family C include Pol III; or from family D include Pol D (DP1/DP2 heterodimer), or from family X include Pol β, Pol α, Pol λ, Pol μ, and Terminal deoxynucleotidyl transferase; or from family Y include Pol ι, Pol κ, Pol η, Pol IV, and Pol V; or from family RT include Telomerase.

As shown in FIG. 5, the polymerase 38 is immobilized to the modified dsNA 16' with a tether 46. In another example, the polymerase 38 is immobilized to a substrate with the tether 46. The tether 46 is used as an anchor for the polymerase 38, and it may be desirable that the tether 46 be non-conducting. A non-conducting tether may be particularly desirable when the polymerase 38 is attached to the modified dsNA 16'. Examples of a suitable tether 46 includes polyethylene glycol (PEG) with a cleavable link at some point along the PEG chain, or may include Nickel NTA/His tag chemistry, streptavidin/biotin chemistry (e.g., streptavidin attached to the modified dsNA 16' and biotin attached to the polymerase 38), DNA-DNA hybridization, DNA-PNA hybridization, carboxyl silane 1-ethyl-3-(3-dimethylaminopropyl)carbodiimide (EDC), or any other suitable linker that can attach the polymerase to the modified dsNA 16' or to the substrate surface. In some examples, the tether 46 holds the polymerase 38 at least 10 nm away from the modified dsNA 16'. This may be desirable, for example, so that conformal changes to the polymerase 38, charges of the polymerase 38, and/or charges of the target/template polynucleotide chain 48 held by the polymerase 38 do not interfere with the sensing operation of the modified dsNA 16'.

In an example, the modified dsNA 16' may be initially attached to the polymerase 38 by the tether 46, which includes a cleavable link. This combination may be introduced to the electrodes 12, 14 to attach the opposed ends of the modified dsNA 16' to the electrodes 12, 14 and to attach the polymerase 38 to a substrate surface via, e.g., Nickel NTA/His tag chemistry. In this example, the cleavable link may be cleaved to detach the polymerase 38 from the modified dsNA 16'. In this example, the polymerase 38 is in proximity to the modified dsNA 16', but is not actually touching it. It is to be understood that the tether 46 may be cleaved when chemistry is provided to hold the polymerase 38, e.g., on the substrate surface and within proximity to the sensor 10.

As mentioned herein, examples of the system 40, 40' may also include the template polynucleotide chain 48 that is to be introduced to the sensor 10.

The template polynucleotide chain 48 may be any sample that is to be sequenced, and may be composed of DNA, RNA, or analogs thereof (e.g., peptide nucleic acids). The source of the template (or target) polynucleotide chain 48 can be genomic DNA, messenger RNA, or other nucleic acids from native sources. In some cases, the template polynucleotide chain 48 that is derived from such sources can be amplified prior to use in a method or system 40, 40' herein. Any of a variety of known amplification techniques can be used including, but not limited to, polymerase chain reaction (PCR), rolling circle amplification (RCA), multiple displacement amplification (MDA), or random primer amplification (RPA). It is to be understood that amplification of the template polynucleotide chain 48 prior to use in the method or system 40, 40' set forth herein is optional. As such, the template polynucleotide chain 48 will not be amplified prior to use in some examples. Template/target polynucleotide chains 48 can optionally be derived from synthetic libraries. Synthetic nucleic acids can have native DNA or RNA compositions or can be analogs thereof.

Biological samples from which the template polynucleotide chain 48 can be derived include, for example, those from a mammal, such as a rodent, mouse, rat, rabbit, guinea pig, ungulate, horse, sheep, pig, goat, cow, cat, dog, primate, human or non-human primate; a plant such as *Arabidopsis thaliana*, corn, sorghum, oat, wheat, rice, canola, or soybean; an algae such as *Chlamydomonas reinhardtii*; a nematode such as *Caenorhabditis elegans*; an insect such as *Drosophila melanogaster*, mosquito, fruit fly, honey bee or spider; a fish such as zebrafish; a reptile; an amphibian such as a frog or *Xenopus laevis*; a Dictyostelium discoideum; a fungi such as *Pneumocystis carinii Takifugu rubripes*, yeast, Saccharamoyces *cerevisiae* or *Schizosaccharomyces pombe*; or a *Plasmodium falciparum*. Template polynucleotide chains 48 can also be derived from prokaryotes such as a bacterium, *Escherichia coli*, staphylococci or *Mycoplasma pneumoniae*; an archae; a virus such as Hepatitis C virus, ebola virus or human immunodeficiency virus; or a viroid. Template polynucleotide chains 48 can be derived from a homogeneous culture or population of the above organisms or alternatively from a collection of several different organisms, for example, in a community or ecosystem.

Moreover, template polynucleotide chains 48 may not be derived from natural sources, but rather can be synthesized using known techniques. For example, gene expression probes or genotyping probes can be synthesized and used in the examples set forth herein.

In some examples, template polynucleotide chains 48 can be obtained as fragments of one or more larger nucleic acids. Fragmentation can be carried out using any of a variety of techniques known in the art including, for example, nebulization, sonication, chemical cleavage, enzymatic cleavage, or physical shearing. Fragmentation may also result from use of a particular amplification technique that produces amplicons by copying only a portion of a larger nucleic acid chain. For example, PCR amplification produces fragments having a size defined by the length of the nucleotide sequence on the original template that is between the locations where flanking primers hybridize during amplification. The length of the template polynucleotide chain 48 may be in terms of the number of nucleotides or in terms of a metric length (e.g., nanometers).

A population of template/target polynucleotide chains 48, or amplicons thereof, can have an average strand length that is desired or appropriate for a particular application of the methods or system 40, 40' set forth herein. For example, the average strand length can be less than about 100,000 nucleotides, about 50,000 nucleotides, about 10,000 nucleotides, about 5,000 nucleotides, about 1,000 nucleotides, about 500 nucleotides, about 100 nucleotides, or about 50 nucleotides. Alternatively or additionally, the average strand length can be greater than about 10 nucleotides, about 50 nucleotides, about 100 nucleotides, about 500 nucleotides, about 1,000 nucleotides, about 5,000 nucleotides, about 10,000 nucleotides, about 50,000 nucleotides, or about 100,000 nucleotides. The average strand length for a population of target polynucleotide chains 48, or amplicons thereof, can be in a range between a maximum and minimum value set forth above.

In some cases, a population of template/target polynucleotide chains 48 can be produced under conditions or otherwise configured to have a maximum length for its members. For example, the maximum length for the members can be less than about 100,000 nucleotides, about 50,000 nucleotides, about 10,000 nucleotides, about 5,000 nucleotides, about 1,000 nucleotides, about 500 nucleotides, about 100 nucleotides or about 50 nucleotides. Alternatively or additionally, a population of template polynucleotide chains 48, or amplicons thereof, can be produced under conditions or otherwise configured to have a minimum length for its members. For example, the minimum length for the members can be more than about 10 nucleotides, about 50 nucleotides, about 100 nucleotides, about 500 nucleotides, about 1,000 nucleotides, about 5,000 nucleotides, about 10,000 nucleotides, about 50,000 nucleotides, or about 100,000 nucleotides. The maximum and minimum strand length for template polynucleotide chains 48 in a population can be in a range between a maximum and minimum value set forth above.

As shown in FIG. 5, the template polynucleotide chain 48 (e.g., a single stranded DNA strand) to be sequenced is bound to the polymerase 38 after having been introduced in solution along with reagents, such as the labeled nucleotides 30.

In some examples, several different labeled nucleotides 30 (e.g., respectively labeled with dA, dC, dG, and dT as the nucleotide 32) may be used together in a system 40, 40' including an array of sensors 10. In one example, four different labeled nucleotides 30 are used, each including a different nucleotide 32 and a different nucleotide-specific switch strand 28. As an example, the labeled nucleotides 30 include a first labeled nucleotide, which includes deoxyadenosine polyphosphate as the nucleotide and a first nucleotide-specific switch strand; a second labeled nucleotide, which includes deoxyguanosine polyphosphate as the nucleotide and a second nucleotide-specific switch strand having a different sequence than the first switch strand; a third labeled nucleotide, which includes deoxycytidine polyphosphate as the nucleotide and a third nucleotide-specific switch strand having a different sequence than each of the first and second switch strands; and a fourth labeled nucleotide, which includes deoxythymidine polyphosphate as the nucleotide and a fourth nucleotide-specific switch strand having a different sequence than each of the first, second, and third switch strands. As such, in this example, the first, second, third, and fourth nucleotide-specific switch strands are different from each other. The different switch strands will generate different conductivity changes (when associated at a complementary gap 22), which may be used to identify the specific nucleotide attached thereto.

To determine the identity of the molecule of interest, the disclosed method may apply an AC voltage across the system and reads out the voltage or current response from the transistor. The electrical conductivity of the molecular bridge, and therefore the electrical response of the system, depend on the identity of the molecule of interest. Measurement sensitivity may be improved if the AC voltage frequency is at around the optimal frequency which maximizes the response sensitivity.

Additional details of the embodiments can be found in US2020/0002758, the entirety of each of the disclosures is incorporated herein by reference.

Further Examples

Example 1: A system for identifying a component in a macromolecule, comprising:

a first element having a first resistance, wherein the first resistance depends on the identity of the component;

a second element having a first capacitance, wherein the second element is operably connected with the first element; and an electrical source configured to supply a first periodic waveform with approximately a first frequency whereby the sensitivity of an electrical response of the system to the first resistance is maximized.

Example 2: The system of Example 1, wherein the first frequency depends on the first resistance and the first capacitance.

Example 3: The system of Example 1, wherein the first periodic waveform is sinusoidal.

Example 4: The system of Example 1, wherein the first element and the second element are connected in parallel.

Example 5: The system of Example 1, further comprising a plurality of electrodes and a plurality of transistors.

Example 6: The system of Example 5, wherein one of the plurality of transistors is a field-effect transistor (FET).

Example 7: The system of Example 1, further comprising an electrode and a FET, wherein the electrode is operably connected to one side of the first element, wherein the gate terminal of the FET is operably connected to the opposite side of the first element, and wherein the first element and the second element are connected in parallel.

Example 8: The system of Example 7, wherein the first periodic waveform is supplied as a voltage across the electrode and the source terminal of the FET.

Example 9: The system of Example 7, wherein the first frequency further depends on a second capacitance associated with the FET.

Example 10: The system of Example 9, wherein the second capacitance is the gate capacitance of the FET.

Example 11: The system of Example 1, wherein the electrical source is further configured to supply a second waveform.

Example 12: The system of Example 11, wherein the electrical source is configured to supply the second waveform and the first periodic waveform simultaneously.

Example 13: The system of Example 11, wherein the second waveform is periodic.

Example 14: The system of Example 11, wherein the second waveform is a direct current (DC) waveform.

Example 15: The system of Example 1, wherein the macromolecule comprises a plurality of types of polymers, and wherein the component is a monomer of one of the plurality of types of polymers.

Example 16: The system of Example 1, wherein the macromolecule comprises one or more polypeptides, and wherein the component is an amino acid.

Example 17: The system of Example 1, wherein the macromolecule comprises one or more polynucleotides, and wherein the component is a nucleotide.

Example 18: The system of Example 17, wherein nucleotides of the one or more polynucleotides are modified and/or labeled such that the values of the first resistance for any two types of nucleotides are distinguishable.

Example 19: The system of Example 17, further comprising a reverse transcriptase, wherein the reverse transcriptase is configured to reverse transcribe a portion of the macromolecule.

Example 20: The system of Example 17, further comprising a DNA polymerase, wherein the DNA polymerase is configured to replicate a portion of the macromolecule.

Example 21: The system of Example 20, further comprising a chamber, an electrolyte in the chamber, and precursors of nucleic acids, wherein the precursors are dissolved in the electrolyte.

Example 22: The system of Example 21, further comprising a polymer tether permanently attached to the DNA polymerase, wherein the polymer tether is configured to be charged in the electrolyte.

Example 23: system of Example 22, wherein parts of the precursors are configured to hybridize with predefined regions of the polymer tether, wherein the predefined regions depend on the types of the precursors.

Example 24: The system of Example 22, wherein the electrical source is further configured to actuate the polymer tether.

Example 25: The system of Example 21, further comprising a fluidic subsystem configured to supply the electrolyte and the precursors to the chamber.

Example 26: The system of Example 21, wherein the precursors are modified and/or labeled such that the values of the first resistance for any two types of precursors are distinguishable.

Example 27: The system of Example 26, wherein the precursors are coupled to ionophores or portions of ionophores.

Example 28: The system of Example 1, wherein the second element comprises at least one dielectric layer and at least one conductive layer.

Example 29: The system of Example 28, wherein the first element comprises a modified, partially double-stranded nucleic acid polymer.

Example 30: The system of Example 29, wherein the modified, partially double-stranded nucleic acid polymer comprises:

two polynucleotide chains partially bonded together;

a gap in one polynucleotide chain wherein nucleotides are missing; and a plurality of nucleotide bases of the other polynucleotide chain exposed at the gap.

Example 31: The system of Example 1, wherein the second element comprises a membrane.

Example 32: The system of Example 31, wherein the membrane is formed of lipid, silicon, graphene, a solid-state material, a synthetic material, a biomimetic equivalent of lipid, or any combination thereof.

Example 33: The system of Example 31, further comprising an ionophore or a portion of an ionophore deposited in the membrane.

Example 34: The system of Example 33, wherein the first element comprises an ion channel formed in the membrane based in part on the ionophore or the portion of an ionophore.

Example 35: The system of Example 31, wherein the first element comprises a nanopore.

Example 36: The system of Example 35, wherein the nanopore is a hole in the membrane.

Example 37: The system of Example 35, wherein the nanopore comprises a structure deposited in the membrane, wherein the structure is formed of one or more polynucleotides, one or more polypeptides, one or more types of biopolymers, one or more carbon nanotubes, one or more types of solid-state materials, or any combination thereof.

Example 38: An array of a plurality of sequencers, wherein at least one sequencer is defined according to the system of any of the previous Examples.

Example 39: A method of using the system as defined in any of Examples 7-10, the method comprising measuring a response of the FET as a function of the identity of the component to identify the component in the macromolecule.

Example 40: The method of Example 39, wherein measuring the response comprises measuring the FET gate-source voltage, the FET source-drain current, the FET drain-to-source resistance, or any combination thereof.

Example 41: The method of Example 39, wherein measuring the response comprises measuring a phase of the response, an amplitude of the response, a waveform of the response, or any combination thereof.

Example 42: The method of Example 39, the method further comprising setting the first frequency to a value such that the partial derivative of the response of the FET with respect to the first resistance is maximal or minimal.

Example 43: The method of Example 39, the method further comprising setting the first frequency to a value such that measured variation in the response of the FET with respect to changing the first resistance is larger than a threshold.

Example 44: The method of Example 42, the method further comprising configuring the electrical source to supply the first periodic waveform at a frequency within 10% of the first frequency.

Example 45: The method of Example 42, the method further comprising configuring the electrical source to supply the first periodic waveform at a frequency having the same order of magnitude as the first frequency.

Definitions

All technical and scientific terms used herein have the same meaning as commonly understood to one of ordinary skill in the art to which this disclosure belongs unless clearly indicated otherwise.

As used herein, the singular forms "a", "and", and "the" include plural referents unless the context clearly dictates otherwise. Thus, for example, reference to "a sequence" may include a plurality of such sequences, and so forth.

The terms comprising, including, containing and various forms of these terms are synonymous with each other and are meant to be equally broad. Moreover, unless explicitly stated to the contrary, examples comprising, including, or having an element or a plurality of elements having a particular property may include additional elements, whether or not the additional elements have that property.

As used herein, "cis" refers to the side of a nanopore opening through which an analyte or modified analyte enters the opening or across the face of which the analyte or modified analyte moves.

As used herein, "trans" refers to the side of a nanopore opening through which an analyte or modified analyte (or fragments thereof) exits the opening or across the face of which the analyte or modified analyte does not move.

As used herein, the terms "fluidically connecting," "fluid communication," "fluidically coupled," and the like refer to two spatial regions being connected together such that a liquid or gas may flow between the two spatial regions. For example, a cis well/wells may be fluidically connected to a trans well/wells by way of a middle well, a fluidic tunnel, a narrower region, or a pore, e.g., a nanopore, such that at least a portion of an electrolyte may flow between the connected wells. The two spatial regions may be in fluid communication through first and second nanoscale openings, or through one or more valves, restrictors, or other fluidic components that are to control or regulate a flow of fluid through a system.

As used herein, the term "operably connected" refers to a configuration of elements, wherein an action or reaction of one element affects another element, but in a manner that preserves each element's functionality.

As used herein, the term "membrane" refers to a non-permeable or semi-permeable barrier or other sheet that separates two liquid/gel chambers (e.g., a cis well and a fluidic cavity) which can contain the same compositions or different compositions therein. The permeability of the membrane to any given species depends upon the nature of the membrane. In some examples, the membrane may be non-permeable to ions, to electric current, and/or to fluids. For example, a lipid membrane may be impermeable to ions (i.e., does not allow any ion transport therethrough), but may be at least partially permeable to water (e.g., water diffusivity ranges from about 40 µm/s to about 100 µm/s). For another example, a synthetic/solid-state membrane, one example of which is silicon nitride, may be impermeable to ions, electric charge, and fluids (i.e., the diffusion of all of these species is zero). Any membrane may be used in accordance with the present disclosure, as long as the membrane can include a transmembrane nanoscale opening and can maintain a potential difference across the membrane. The membrane may be a monolayer or a multilayer membrane. A multilayer membrane includes two or more layers, each of which is a non-permeable or semi-permeable material.

The membrane may be formed of materials of biological or non-biological origin. A material that is of biological origin refers to material derived from or isolated from a biological environment such as an organism or cell, or a synthetically manufactured version of a biologically available structure (e.g., a biomimetic material).

An example membrane that is made from the material of biological origin includes a monolayer formed by a bola-lipid. Another example membrane that is made from the material of biological origin includes a lipid bilayer. Suitable lipid bilayers include, for example, a membrane of a cell, a membrane of an organelle, a liposome, a planar lipid bilayer, and a supported lipid bilayer. A lipid bilayer can be formed, for example, from two opposing layers of phospholipids, which are arranged such that their hydrophobic tail groups face towards each other to form a hydrophobic interior, whereas the hydrophilic head groups of the lipids face outwards towards the aqueous environment on each side of the bilayer. Lipid bilayers also can be formed, for example, by a method in which a lipid monolayer is carried on an aqueous solution/air interface past either side of an aperture that is substantially perpendicular to that interface. The lipid is normally added to the surface of an aqueous electrolyte solution by first dissolving it in an organic solvent and then allowing a drop of the solvent to evaporate on the surface of the aqueous solution on either side of the aperture. Once the organic solvent has at least partially evaporated, the solution/air interfaces on either side of the aperture are physically moved up and down past the aperture until a bilayer is formed. Other suitable methods of bilayer formation include tip-dipping, painting bilayers, and patch-clamping of liposome bilayers. Any other methods for obtaining or generating lipid bilayers may also be used.

A material that is not of biological origin may also be used as the membrane. Some of these materials are solid-state materials and can form a solid-state membrane, and others of these materials can form a thin liquid film or membrane. The solid-state membrane can be a monolayer, such as a coating or film on a supporting substrate (i.e., a solid support), or a freestanding element. The solid-state membrane can also be a composite of multilayered materials in a sandwich configuration. Any material not of biological origin may be used, as long as the resulting membrane can include a transmembrane nanoscale opening and can maintain a potential difference across the membrane. The membranes may include organic materials, inorganic materials, or both. Examples of suitable solid-state materials include, for example, microelectronic materials, insulating materials (e.g., silicon nitride ($Si_3N_4$), aluminum oxide ($Al_2O_3$), hafnium oxide ($HfO_2$), tantalum pentoxide ($Ta_2O_5$), silicon oxide ($SiO_2$), etc.), some organic and inorganic polymers (e.g., polyamide, plastics, such as polytetrafluoroethylene (PTFE), or elastomers, such as two-component addition-cure silicone rubber), and glasses. In addition, the solid-state membrane can be made from a monolayer of graphene, which is an atomically thin sheet of carbon atoms densely packed into a two-dimensional honeycomb lattice, a multilayer of graphene, or one or more layers of graphene mixed with one or more layers of other solid-state materials. A graphene-containing solid-state membrane can include at least one graphene layer that is a graphene nanoribbon or graphene nanogap, which can be used as an electrical sensor to characterize the target polynucleotide. It is to be understood that the solid-state membrane can be made by any suitable method, for example, chemical vapor deposition (CVD). In an example, a graphene membrane can be prepared through either CVD or exfoliation from graphite. Examples of suitable thin liquid film materials that may be used include diblock copolymers or triblock copolymers, such as amphiphilic PMOXA-PDMS-PMOXA ABA triblock copolymers.

As used herein, the term "nanopore" is intended to mean a hollow structure discrete from, or defined in, and extending across the membrane that permits ions, electric current, and/or fluids to cross from one side of the membrane to the other side of the membrane. For example, a membrane that inhibits the passage of ions or water-soluble molecules can include a nanopore structure that extends across the membrane to permit the passage (through a nanoscale opening extending through the nanopore structure) of the ions or water-soluble molecules from one side of the membrane to the other side of the membrane. The diameter of the nanoscale opening extending through the nanopore structure can vary along its length (i.e., from one side of the membrane to the other side of the membrane), but at any point is on the nanoscale (i.e., from about 1 nm to about 100 nm, or to less than 1000 nm). Examples of the nanopore include, for example, biological nanopores, solid-state nanopores, and biological and solid-state hybrid nanopores.

As used herein, the term "diameter" is intended to mean a longest straight line inscribable in a cross-section of a nanoscale opening through a centroid of the cross-section of the nanoscale opening. It is to be understood that the nanoscale opening may or may not have a circular or substantially circular cross-section (the cross-section of the nanoscale opening being substantially parallel with the cis/trans electrodes). Further, the cross-section may be regularly or irregularly shaped.

As used herein, the term "biological nanopore" is intended to mean a nanopore whose structure portion is made from materials of biological origin. Biological origin refers to a material derived from or isolated from a biological environment such as an organism or cell, or a synthetically manufactured version of a biologically available structure. Biological nanopores include, for example, polypeptide nanopores and polynucleotide nanopores.

As used herein, the term "polypeptide nanopore" is intended to mean a protein/polypeptide that extends across the membrane, and permits ions, electric current, polymers such as DNA or peptides, or other molecules of appropriate dimension and charge, and/or fluids to flow therethrough from one side of the membrane to the other side of the membrane. A polypeptide nanopore can be a monomer, a homopolymer, or a heteropolymer. Structures of polypeptide nanopores include, for example, an α-helix bundle nanopore and a β-barrel nanopore. Example polypeptide nanopores include α-hemolysin, *Mycobacterium smegmatis* porin A (MspA), gramicidin A, maltoporin, OmpF, OmpC, PhoE, Tsx, F-pilus, etc. The protein α-hemolysin is found naturally in cell membranes, where it acts as a pore for ions or molecules to be transported in and out of cells. *Mycobacterium smegmatis* porin A (MspA) is a membrane porin produced by Mycobacteria, which allows hydrophilic molecules to enter the bacterium. MspA forms a tightly interconnected octamer and transmembrane beta-barrel that resembles a goblet and contains a central pore.

A polypeptide nanopore can be synthetic. A synthetic polypeptide nanopore includes a protein-like amino acid sequence that does not occur in nature. The protein-like amino acid sequence may include some of the amino acids that are known to exist but do not form the basis of proteins (i.e., non-proteinogenic amino acids). The protein-like amino acid sequence may be artificially synthesized rather than expressed in an organism and then purified/isolated.

As used herein, the term "polynucleotide nanopore" is intended to include a polynucleotide that extends across the membrane, and permits ions, electric current, and/or fluids to flow from one side of the membrane to the other side of the membrane. A polynucleotide pore can include, for example, a polynucleotide origami (e.g., nanoscale folding of DNA to create the nanopore).

As used herein, the term "solid-state nanopore" is intended to mean a nanopore whose structure portion is defined by a solid-state membrane and includes materials of non-biological origin (i.e., not of biological origin). A solid-state nanopore can be formed of an inorganic or organic material. Solid-state nanopores include, for example, silicon nitride nanopores, silicon dioxide nanopores, and graphene nanopores.

The nanopores disclosed herein may be hybrid nanopores. A "hybrid nanopore" refers to a nanopore including materials of both biological and non-biological origins. An example of a hybrid nanopore includes a polypeptide-solid-state hybrid nanopore and a polynucleotide-solid-state nanopore.

As used herein, the term "nanopore sequencer" refers to any of the devices disclosed herein that can be used for nanopore sequencing. In the examples disclosed herein, during nanopore sequencing, the nanopore is immersed in examples of the electrolyte disclosed herein and a potential difference is applied across the membrane. In an example, the potential difference is an electric potential difference or an electrochemical potential difference. An electrical potential difference can be imposed across the membrane via a voltage source that injects or administers current to at least one of the ions of the electrolyte contained in the cis well or one or more of the trans wells. An electrochemical potential difference can be established by a difference in ionic composition of the cis and trans wells in combination with an electrical potential. The different ionic composition can be, for example, different ions in each well or different concentrations of the same ions in each well.

The application of the potential difference across a nanopore may force the translocation of a nucleic acid through the nanopore. One or more signals are generated that correspond to the translocation of the nucleotide through the nanopore. Accordingly, as a target polynucleotide, or as a mononucleotide or a probe derived from the target polynucleotide or mononucleotide, transits through the nanopore, the current across the membrane changes due to base-dependent (or probe dependent) blockage of the constriction, for example. The signal from that change in current can be measured using any of a variety of methods. Each signal is unique to the species of nucleotide(s) (or probe) in the nanopore, such that the resultant signal can be used to determine a characteristic of the polynucleotide. For example, the identity of one or more species of nucleotide(s) (or probe) that produces a characteristic signal can be determined.

As used herein, a "nucleotide" includes a nitrogen containing heterocyclic base, a sugar, and one or more phosphate groups. Nucleotides are monomeric units of a nucleic acid sequence. Examples of nucleotides include, for example, ribonucleotides or deoxyribonucleotides. In ribonucleotides (RNA), the sugar is a ribose, and in deoxyribonucleotides (DNA), the sugar is a deoxyribose, i.e., a sugar lacking a hydroxyl group that is present at the 2' position in ribose. The nitrogen containing heterocyclic base can be a purine base or a pyrimidine base. Purine bases include adenine (A) and guanine (G), and modified derivatives or analogs thereof. Pyrimidine bases include cytosine (C), thymine (T), and uracil (U), and modified derivatives or analogs thereof. The C-1 atom of deoxyribose is bonded to N-1 of a pyrimidine or N-9 of a purine. The phosphate groups may be in the mono-, di-, or tri-phosphate form. These nucleotides are natural nucleotides, but it is to be further understood that non-natural nucleotides, modified nucleotides or analogs of the aforementioned nucleotides can also be used.

As used herein, the term "signal" is intended to mean an indicator that represents information. Signals include, for example, an electrical signal and an optical signal. The term "electrical signal" refers to an indicator of an electrical quality that represents information. The indicator can be, for example, current, voltage, tunneling, resistance, potential, voltage, conductance, or a transverse electrical effect. An "electronic current" or "electric current" refers to a flow of electric charge. In an example, an electrical signal may be an electric current passing through a nanopore, and the electric current may flow when an electric potential difference is applied across the nanopore.

The term "substrate" refers to a rigid, solid support that is insoluble in aqueous liquid and is incapable of passing a liquid absent an aperture, port, or other like liquid conduit. In the examples disclosed herein, the substrate may have wells or chambers defined therein. Examples of suitable substrates include glass and modified or functionalized glass, plastics (including acrylics, polystyrene and copolymers of styrene and other materials, polypropylene, polyethylene, polybutylene, polyurethanes, polytetrafluoroethylene (PTFE) (such as TEFLON® from Chemours), cyclic olefins/cyclo-olefin polymers (COP) (such as ZEONOR® from Zeon), polyimides, etc.), nylon, ceramics, silica or silica-based materials, silicon and modified silicon, carbon, metals, inorganic glasses, and optical fiber bundles.

The terms top, bottom, lower, upper, on, etc. are used herein to describe the device/nanopore sequencer and/or the various components of the device. It is to be understood that these directional terms are not meant to imply a specific orientation, but are used to designate relative orientation between components. The use of directional terms should not be interpreted to limit the examples disclosed herein to any specific orientation(s). As used herein, the terms "upper", "lower", "vertical", "horizontal" and the like are meant to indicate relative orientation.

As used herein, the terms "well", "cavity" and "chamber" are used synonymously, and refer to a discrete feature defined in the device that can contain a fluid (e.g., liquid, gel, gas). A cis well is a chamber that contains or is partially defined by a cis electrode, and is also fluidically connected to the fluidic system of a FET which in turn is fluidically connected to a trans well/chamber. Examples of an array of the present device may have one cis well or multiple cis wells. The trans well is a single chamber that contains or is partially defined by its own trans electrode, and is also fluidically connected to a cis well. In examples including multiple trans wells, each trans well is electrically isolated from each other trans well. Further, it is to be understood that the cross-section of a well taken parallel to a surface of a substrate at least partially defining the well can be curved, square, polygonal, hyperbolic, conical, angular, etc.

As used herein, "field-effect transistors" or "FETs" typically include doped source/drain regions that are formed of a semiconductor material, e.g., silicon, germanium, gallium arsenide, silicon carbide, etc., and are separated by a channel region. A n-FET is a FET having an n-channel in which the current carriers are electrons. A p-FET is a FET having a p-channel in which the current carriers are holes. Source/drain regions of a n-FET device may include a different material than source/drain regions of a p-FET device. In some examples, the source/drain regions or the channel may not be doped. Doped regions may be formed by adding dopant atoms to an intrinsic semiconductor. This changes the electron and hole carrier concentrations of the intrinsic semiconductor at thermal equilibrium. A doped region may be p-type or n-type. As used herein, "p-type" refers to the addition of impurities to an intrinsic semiconductor that creates a deficiency of valence electrons. For silicon, example p-type dopants, i.e., impurities, include but are not limited to boron, aluminum, gallium, and indium. As used herein, "n-type" refers to the addition of impurities that contribute free electrons to an intrinsic semiconductor. For silicon, example n-type dopants, i.e., impurities, include but are not limited to, antimony, arsenic, and phosphorus. The dopant(s) may be introduced by ion implantation or plasma doping.

For example, in an integrated circuit having a plurality of metal oxide semiconductor field effect transistors (MOSFETs), each MOSFET has a source and a drain that are formed in an active region of a semiconductor layer by implanting n-type or p-type impurities in the layer of semiconductor material. Disposed between the source and the drain is a channel (or body) region. Disposed above the body region is a gate electrode. The gate electrode and the body are spaced apart by a gate dielectric (gate oxide) layer. The channel region connects the source and the drain, and electrical current flows through the channel region from the source to the drain. The electrical current flow is induced in the channel region by a voltage applied at the gate electrode.

Non-planar transistor device architectures, such as nanosheet (or nanowire) transistors, can provide increased device density and increased performance over planar transistors. A "gate-all-around" transistor is a transistor in which the gate is structured to wrap around the channel. A "nanosheet transistor" refers to a type of FET that may include a plurality of stacked nanosheets extending between a pair of source/drain regions, forming a channel. Nanosheet transistors, in contrast to conventional planar FETs, may include a gate stack that wraps around the full perimeter of multiple nanosheet channel regions. Nanosheet transistor configurations enable fuller depletion in the nanosheet channel regions and reduce short-channel effects. "Nanowire transistors" may be similar to nanosheet transistors, except the channel may include nanowires instead of nanosheets. The gate-all-around structure in nanosheet or nanowire transistors can provide very small devices with better switching control, lower leakage current, faster operations, and lower output resistance.

A way of increasing channel conductivity and decreasing FET size is to form the channel as a nanostructure. For example, a gate-all-around (GAA) nanosheet FET is an architecture for providing a relatively small FET footprint by forming the channel region as a series of nanosheets. In a GAA configuration, a nanosheet-based FET includes a source region, a drain region and stacked nanosheet channels between the source and drain regions. A gate surrounds the stacked nanosheet channels and regulates electron flow through the nanosheet channels between the source and drain regions. GAA nanosheet FETs may be fabricated by forming alternating layers of channel nanosheets and sacrificial nanosheets. The sacrificial nanosheets are released from the channel nanosheets before the FET device is finalized. For n-type FETs, the channel nanosheets are typically silicon (Si) and the sacrificial nanosheets are typically silicon germanium (SiGe). For p-type FETs, the channel nanosheets are typically SiGe and the sacrificial nanosheets are typically Si. In some implementations, the channel nanosheet of a p-FET can be SiGe or Si, and the sacrificial nanosheets can be Si or SiGe. Forming the GAA nanosheets from alternating layers of channel nanosheets formed from a first type of semiconductor material (e.g., Si for n-type FETs, and SiGe for p-type FETs) and sacrificial nanosheets formed from a second type of semiconductor material (e.g., SiGe for n-type FETs, and Si for p-type FETs) provides superior channel electrostatics control, which is beneficial for continuously scaling gate lengths down to seven nanometer CMOS technology and below. The use of multiple layered SiGe/Si sacrificial/channel nanosheets (or Si/SiGe sacrificial/channel nanosheets) to form the channel regions in GAA FET semiconductor devices provides desirable device characteristics, including the introduction of strain at the interface between SiGe and Si.

In some examples, a "nanowire" is characterized by a critical dimension of less than about 30 nm, while a "nanosheet" is characterized by a critical dimension of about 30 nm or greater. In exemplary devices, the critical dimension is measured along the gate. In that direction, if the width of the channel is small, the channel cross-section is like a "wire" whereas if the width of the channel is large, the channel cross-section is like a "sheet."

In some examples, the smallest dimension of the nanosheet or nanowire is between about 1-10, about 1-50, about 1-100, about 1-500, or about 1-1000 nm. In some examples, the smallest dimension of the nanosheet or nanowire is between about 1-5, about 3-10, about 5-15, about 10-20, about 15-30, about 20-40, about 30-50, about 40-75, about 50-100, about 75-150, about 100-200, about 150-300, about 200-400, about 300-500, about 400-750, or about 500-1000 nm. In some examples, the smallest dimension of the nanosheet is at least about 3, about 5, about 7, about 10, about 15, about 20, about 50, about 100, about 150, about 200, about 250, about 300, about 350, about 400, about 450, about 500, about 600, about 700, about 800, about 900, about 1000, about 2000, about 2500, about 3000, about 4000, or about 5000 times smaller than the other two dimensions of the nanosheet. In some examples, the smallest dimension of the nanosheet is between about 2-5, about 3-7, about 5-10, about 7-15, about 10-20, about 15-50, about 20-100, about 50-150, about 100-200, about 150-250, about 200-300, about 250-350, about 300-400, about 350-450, about 400-500, about 450-600, 5 about 00-700, about 600-800, about 700-900, about 800-1000, about 900-2000, about 1000-2500, about 2000-3000, about 2500-4000, or about 3000-5000 times smaller than the other two dimensions of the nanosheet. In some examples, the smallest dimension of the nanosheet is at most about 3, about 5, about 7, about 10, about 15, about 20, about 50, about 100, about 150, about 200, about 250, about 300, about 350, about 400, about 450, about 500, about 600, about 700, about 800, about 900, about 1000, about 2000, about 2500, about 3000, about 4000, or about 5000 times smaller than the other two dimensions of the nanosheet. In some examples, the biggest dimension of the nanowire is at least about 3, about 5, about 7, about 10, about 15, about 20, about 50, about 100, about 150, about 200, about 250, about 300, about 350, about 400, about 450, about 500, about 600, about 700, about 800, about 900, about 1000, about 2000, about 2500, about 3000, about 4000, or about 5000 times bigger than the other two dimensions of the nanowire. In some examples, the biggest dimension of the nanowire is between about 2-5, about 3-7, about 5-10, about 7-15, about 10-20, about 15-50, about 20-100, about 50-150, about 100-200, about 150-250, about 200-300, about 250-350, about 300-400, about 350-450, about 400-500, about 450-600, about 500-700, about 600-800, about 700-900, about 800-1000, about 900-2000, about 1000-2500, about 2000-3000, about 2500-4000, or about 3000-5000 times bigger than the other two dimensions of the nanowire. In some examples, the biggest dimension of the nanowire is at most about 3, about 5, about 7, about 10, about 15, about 20, about 50, about 100, about 150, about 200, about 250, about 300, about 350, about 400, about 450, about 500, about 600, about 700, about 800, about 900, about 1000, about 2000, about 2500, about 3000, about 4000, or about 5000 times bigger than the other two dimensions of the nanowire.

The aspects and examples set forth herein and recited in the claims can be understood in view of the above definitions.

Additional Notes

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range, as if such value or sub-range were explicitly recited. For example, a range from about 2 nm to about 20 nm should be interpreted to include not only the explicitly recited limits of from about 2 nm to about 20 nm, but also to include individual values, such as about 3.5 nm, about 8 nm, about 18.2 nm, etc., and sub-ranges, such as from about 5 nm to about 10 nm, etc. Furthermore, when "about" and/or "substantially" are/is utilized to describe a value, this is meant to encompass minor variations (up to +/−10%) from the stated value.

While several examples have been described in detail, it is to be understood that the disclosed examples may be modified. Therefore, the foregoing description is to be considered non-limiting.

While certain examples have been described, these examples have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure.

Features, materials, characteristics, or groups described in conjunction with a particular aspect, or example are to be understood to be applicable to any other aspector example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing examples. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations, one or more features from a claimed combination can, in some cases, be excised from the combination, and the combination may be claimed as a sub-combination or variation of a sub-combination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some examples, the actual steps taken in the processes illustrated and/or disclosed may differ from those shown in the figures. Depending on the example, certain of the steps described above may be removed or others may be added. Furthermore, the features and attributes of the specific examples disclosed above may be combined in different ways to form additional examples, all of which fall within the scope of the present disclosure. Also, the separation of various system components in the implementations described above should not be understood as requiring such separation in all implementations, and it should be understood that the described components and systems can generally be integrated together in a single product or packaged into multiple products. For example, any of the components for an energy storage system described herein can be provided separately, or integrated together (e.g., packaged together, or attached together) to form an energy storage system.

For purposes of this disclosure, certain aspects, advantages, and novel features are described herein. Not necessarily all such advantages may be achieved in accordance with any particular example. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain examples include, while other examples do not include, certain features, elements, and/or steps. Thus, such conditional language is not generally intended to imply that features, elements, and/or steps are in any way required for one or more examples or that one or more examples necessarily include logic for deciding, with or without user input or prompting, whether these features, elements, and/or steps are included or are to be performed in any particular example.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain examples require the presence of at least one of X, at least one of Y, and at least one of Z.

Language of degree used herein, such as the terms "approximately," "about," "generally," and "substantially" represent a value, amount, or characteristic close to the stated value, amount, or characteristic that still performs a desired function or achieves a desired result.

The scope of the present disclosure is not intended to be limited by the specific disclosures of preferred examples in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A nanopore sensor device for identifying nucleotides, comprising:
    one or more cis wells;

one or more cis electrodes associated with the one or more cis wells;
a plurality of trans wells, each of the plurality of trans wells separated from the one or more cis wells by a lipid or solid-state membrane having a nanopore;
a plurality of field effect transistors (FETs), each of the plurality of FETs associated with one of the plurality of trans wells;
an electrical source configured to provide alternating current (AC) inputs between the one or more cis electrodes and the source terminals of the plurality of FETs; and
a controller operably coupled to the plurality of FETs, the controller configured to measure AC responses of the plurality of FETs, wherein the AC responses depend on the identities of the nucleotides within or near the nanopores.

2. The nanopore sensor device of claim 1, wherein the controller is configured to measure changes of the amplitudes of the AC responses.

3. The nanopore sensor device of claim 1, wherein the controller is configured to measure changes of the waveform shapes of the AC responses.

4. The nanopore sensor device of claim 1, wherein the electrical source is configured to provide an AC voltage in a sinusoidal, rectangular, triangular, saw-tooth, or another suitable waveform alternating between a positive potential and a negative potential.

5. The nanopore sensor device of claim 1, wherein ionic fluxes through the nanopores are modulated by: nucleotides passing through the nanopores, labels on nucleotides being incorporated to polynucleotides, or any combination thereof.

6. A method of identifying nucleotides, comprising:
providing a nanopore within a membrane separating a cis well and a trans well;
providing an AC input from an electrical source operably coupled to a cis electrode in the cis well and to the source terminal of a FET in the trans well; and
measuring an AC response from the FET, wherein the AC response depends on the identity of a nucleotide within or near the nanopore.

7. The method of claim 6, wherein measuring the AC response comprises measuring a change of the amplitude of the AC response.

8. The method of claim 6, wherein measuring the AC response comprises measuring a change of the waveform of the AC response.

9. The method of claim 6, wherein providing the AC input comprises providing an AC voltage in a sinusoidal, rectangular, triangular, saw-tooth, or another suitable waveform alternating between a positive potential and a negative potential.

10. The method of claim 6, wherein measuring the AC response comprises measuring a first response associated with a first nucleotide and a second response associated with a second nucleotide without waiting for a transient response to approach a steady-state response.

11. A sensor device for identifying nucleotides, comprising:
an electrode;
a FET;
a partially double-stranded nucleic acid polymer having one end operably coupled to the electrode and the other end operably coupled to the gate terminal of the FET;
an electrical source configured to provide an AC input between the electrode and the source terminal of the FET; and
a controller operably coupled to the FET, the controller configured to measure an AC response of the FET, wherein the AC response depends on the identity of a nucleotide interacting with the partially double-stranded nucleic acid polymer.

12. The sensor device of claim 11, wherein the controller is configured to measure a change of the amplitude of the AC response.

13. The sensor device of claim 11, wherein the controller is configured to measure a change of the waveform shape of the AC response.

14. The sensor device of claim 11, wherein the electrical source is configured to provide an AC voltage in a sinusoidal, rectangular, triangular, saw-tooth, or another suitable waveform alternating between a positive potential and a negative potential.

15. The sensor device of claim 11, wherein electrical conduction through the partially double-stranded nucleic acid polymer is modulated by a nucleic acid label on a nucleotide being incorporated to a polynucleotide, the nucleic acid label being partially complementary to the partially double-stranded nucleic acid polymer.

16. The method of claim 6, wherein measuring the AC response comprises measuring the FET gate-source voltage, the FET source-drain current, the FET drain-to-source resistance, or any combination thereof.

17. The method of claim 6, wherein the electrical source is configured to supply a first periodic waveform with approximately a first frequency whereby the sensitivity of the AC response to the resistance of the nanopore is maximized.

18. The method of claim 17, wherein the resistance of the nanopore depends on the identity of a nucleotide within or near the nanopore.

19. The method of claim 17, wherein the first frequency depends on the resistance of the nanopore and the capacitance of the membrane.

20. The method of claim 18, wherein the first frequency further depends on the gate capacitance of the FET.

* * * * *